(12) United States Patent
Lombardo et al.

(10) Patent No.: US 8,576,930 B2
(45) Date of Patent: Nov. 5, 2013

(54) RECEIVER FOR SIGNAL COMMUNICATION APPARATUS AND RELATED SIGNAL COMMUNICATION APPARATUS

(75) Inventors: Giovanni Lombardo, Alcamo (IT); Salvatore Giombanco, Cassaro (IT); Michele Grande, Avola (IT); Salvatore Tumminaro, Marianopoli (IT); Filippo Marino, Tremestieri Etneo (IT)

(73) Assignee: STMicoelectronics S.r.l., Agrate Brianza (IT)

( * ) Notice: Subject to any disclaimer, the term of this patent is extended or adjusted under 35 U.S.C. 154(b) by 531 days.

(21) Appl. No.: 12/846,508

(22) Filed: Jul. 29, 2010

(65) Prior Publication Data
US 2011/0026612 A1    Feb. 3, 2011

(30) Foreign Application Priority Data

Jul. 31, 2009  (IT) .............................. MI2009A1381
Jul. 31, 2009  (IT) .............................. MI2009A1382

(51) Int. Cl.
*H04B 3/54*    (2006.01)

(52) U.S. Cl.
USPC ...................................................... 375/258

(58) Field of Classification Search
USPC .................... 323/283; 324/765, 769; 333/12; 341/160; 370/347, 475; 375/257, 258, 375/316, 318, 322, 330, 333, 347, 371, 375/375; 455/78, 137; 713/300, 320, 330; 714/742
See application file for complete search history.

(56) References Cited

U.S. PATENT DOCUMENTS

| | | | |
|---|---|---|---|
| 4,833,418 A | 5/1989 | Quintus et al. | |
| 5,389,778 A | 2/1995 | Shinomiya | |
| 5,568,561 A | 10/1996 | Whitlock | |
| 5,952,849 A | 9/1999 | Haigh | |
| 6,226,331 B1 | 5/2001 | Gambuzza | |
| 6,937,454 B2 | 8/2005 | Mikolajczak et al. | |
| 7,139,528 B2 | 11/2006 | Gambuzza | |
| 7,288,940 B2 | 10/2007 | Wynne et al. | |
| 7,741,943 B2 | 6/2010 | Fouquet et al. | |
| 7,791,900 B2 | 9/2010 | Fouquet et al. | |
| 7,796,684 B2 | 9/2010 | Trott | |
| 8,129,969 B1* | 3/2012 | Chui et al. ..................... | 323/283 |
| 2003/0208711 A1* | 11/2003 | Frame et al. ................... | 714/742 |
| 2004/0155720 A1* | 8/2004 | Yasui et al. ..................... | 333/12 |
| 2005/0110700 A1 | 5/2005 | Terry | |

(Continued)

FOREIGN PATENT DOCUMENTS

| | | |
|---|---|---|
| EP | 1087333 A2 | 3/2001 |
| WO | 03/009551 A2 | 1/2003 |
| WO | 2004/042543 A1 | 5/2004 |

*Primary Examiner* — Sam K Ahn
*Assistant Examiner* — Shawkat M Ali
(74) *Attorney, Agent, or Firm* — Seed IP Law Group PLLC

(57) ABSTRACT

A receiver of a signal communication apparatus; the apparatus including a transmitter adapted to transmit coded signals, the receiver for receiving the signal and a wireless interface interposed between the transmitter and the receiver and having a transmitting antenna and a receiving antenna. The receiver includes a decoder configured to decode the received signal and circuitry coupled to the receiving antenna and capable of triggering the decoder if the value of the received signal is outside a logical hysteresis having a first logic threshold having a value smaller than the value of the direct current component of the received signal and a second logic threshold having a value greater than the value of the direct current component of the received signal.

23 Claims, 16 Drawing Sheets

(56) References Cited

U.S. PATENT DOCUMENTS

| | | |
|---|---|---|
| 2006/0153495 A1 | 7/2006 | Wynne et al. |
| 2008/0061631 A1 | 3/2008 | Fouquet et al. |
| 2008/0069249 A1 | 3/2008 | Florence |
| 2008/0179963 A1 | 7/2008 | Fouquet et al. |
| 2008/0198904 A1 | 8/2008 | Chang |
| 2008/0278275 A1 | 11/2008 | Fouquet et al. |
| 2008/0311862 A1* | 12/2008 | Spina et al. ............ 455/78 |
| 2008/0317106 A1 | 12/2008 | Leung et al. |
| 2009/0028279 A1* | 1/2009 | Kitta ............ 375/371 |
| 2009/0150707 A1* | 6/2009 | Drucker et al. ............ 713/401 |
| 2009/0153283 A1 | 6/2009 | Fouquet et al. |
| 2009/0206960 A1 | 8/2009 | Ng et al. |
| 2009/0213914 A1 | 8/2009 | Dong et al. |
| 2010/0020448 A1 | 1/2010 | Ng et al. |
| 2010/0052826 A1 | 3/2010 | Callahan et al. |
| 2010/0148911 A1 | 6/2010 | Fouquet et al. |
| 2010/0176660 A1 | 7/2010 | Fouquet et al. |
| 2010/0329363 A1 | 12/2010 | Ng et al. |
| 2011/0080323 A1 | 4/2011 | Thiam et al. |
| 2011/0095620 A1 | 4/2011 | Fouquet et al. |

* cited by examiner

RECEIVER FOR SIGNAL COMMUNICATION APPARATUS AND RELATED SIGNAL COMMUNICATION APPARATUS

BACKGROUND

1. Technical Field

The present disclosure relates to a receiver for a signal communication apparatus and related signal communication apparatus and methods.

2. Description of the Related Art

Galvanic isolation is used in applications in which the communication between circuits operating at high supply voltages (even hundreds of volts) and circuits rather operating at low supply voltages; the galvanic isolation provides for the safety of the user coming in contact with the low voltage interface. The applications using galvanic isolation are typically those regarding the power supplies directly bonded to the power network, and also the industrial applications in which driving high voltage loads occurs.

A typical example are the "high side switch drivers" in which driving switches feed inductive loads with high voltages. In such a case the potential differences that may dynamically develop between the low voltage part and the high voltage part may also reach thousands of volts per microsecond.

Several apparatuses for achieving the galvanic isolation presently exist.

One of these uses an integrated transformer. The latter is made of a pile structure in which the secondary winding generally has a metal layer arranged at the lowermost level, the primary winding has a metal layer arranged at the uppermost level and the isolation between the two windings comprises several layers of dielectric arranged between the two metal layers the thickness of which depends on the desired isolation level. Alternatively, the secondary winding may be made of the metal layer arranged at the uppermost level, the dielectric layer is inserted thereon and the primary winding is finally made of an additional metal layer. The isolation transformer is made on the die of the receiver. The die driver contains the transmitter that, through the bonding, is bonded to the primary of the isolation transformer. The secondary of the transformer is bonded to the receiver which processes the transmitted signal. The data flow may also occur from the secondary to the primary, in case of constructing a two-way channel. In order to transfer information through the isolated interface, the signals are conveniently processed by a modulation technique. This type of component permits to obtain a high bit rate, good reliability and isolation capacity. This configuration uses, however, the addition of processing steps to construct the transformer (e.g., for increasing the thickness of the isolating layer in order to achieve the suitable isolation rate), as well as the use of bonding wires for bonding the transmitter of the die driver to the transformer itself.

Another galvanic isolation apparatus comprises a structure based on a transmission of the wireless type and it is described in US Patent Publication No. US 2008/0311862. The two chips are assembled one on top of the other and the isolation is achieved through an interposed isolating layer. The electromagnetic coupling is obtained through a couple of turns, particularly by means of the magnetic field produced by the power flowing on the transmitting turn. The thickness of the upper chip (e.g., the chip of the transmitter) is decreased, by lapping, to maximize the coupling between the two turns. In order to transfer information through the isolated interface, the signals are conveniently processed by a modulation technique. This configuration has the advantage of not requiring additional processing steps as well as bonding wires between the two chips. It has however the disadvantage of a low coupling coefficient and its high variability, depending on the thickness tolerance after the die lapping, the tolerance of the isolating layer thickness and the tolerance of the alignment between the two chips.

A further galvanic isolation apparatus comprises a structure based on a transmission of the wireless type and it is still described in US Patent Publication No, 2008/0311862. The two chips, in this case, are assembled side-by-side and the isolation is made through an isolating layer placed under the two chips. The electromagnetic coupling is achieved through a couple of turns, particularly by means of the magnetic field produced by the power flowing on the transmitting turn. In order to transfer information through the isolated interface, the signals are conveniently processed by a modulation technique. This configuration also has the advantage of not requiring additional processing steps as well as bonding wires between the two chips. It has however the disadvantage of a coupling coefficient which is lower than the previous structure and highly variable according to the tolerance of the alignment between the two chips and the tolerance of the distance between the two chips.

BRIEF SUMMARY

An embodiment provides a receiver for a signal communication apparatus and related communication apparatus which is more noise-immune.

In an embodiment, a receiver of a signal communication apparatus, said apparatus comprising a transmitter adapted to transmit at least a coded signal, said receiver for receiving the signal and a wireless interface interposed between the transmitter and the receiver and comprising a transmitting antenna and a receiving antenna, comprises means for decoding the received signal, characterized in that it comprises first means coupled to the receiving antenna and capable of triggering said means of decoding the received signal if the value of the received signal is outside a logical hysteresis of a first logic threshold having a value smaller than the value of the direct current component of the received signal and a second logic threshold having a value greater than the value of the direct current component of the received signal. In an embodiment, the first means comprise second means adapted to compare said received signal to said first and said second logic thresholds and generate logic signals only if the value of said received signal is below said first logic threshold or above said second logic threshold. In an embodiment, said received signal is a differential signal with a first component and a second component and said second means are adapted to compare the components of the differential signal received to said first and said second logic thresholds and generate logic signals only if the value of every one of said components of the received differential signal is below said first logic threshold or above said second logic threshold, said first means comprising third means adapted to generate a pulse to trigger said decoding means of the received signal if the generation of a logic signal due to the comparison of the first component of the differential signal to one of the first and second logic thresholds corresponds to the generation of a logic signal due to the comparison of the second component of the differential signal with the other of the first or second logic threshold. In an embodiment, said first means comprise control means adapted to set up a time period starting from the generation of the first pulse of said third means and due to the generation of a first couple of logic signals, said control means being adapted to check whether within said time period a second pulse is generated, following the first and due to the generation of a second couple of logic signals, and being adapted to trigger said decoding means of the received signal only if the result of the check is positive. In an embodiment, said decoding means of the received signal are adapted to take out a clock signal and a data signal from the received signal. In an embodiment, the third means are two AND ports adapted to provide at the output the first and second pulses and having at the input the first and second couples of logic signals, said control means comprise a first latch having at the input the first pulse and a second latch having at the input the second pulse and said time period as a reset signal, said first and second latches providing a couple of other pulses at the output if both the first and the second pulses are present at the input, said couple of pulses being adapted to trigger said decoding means of the received signal. In an embodiment, said transmitter comprises means adapted to code the data signal to be sent and the clock signal by means of a plurality of current transmission pulses each having a form of the Gaussian type, said received signal comprising a positive pulse with a maximum width at the uplink form of the single transmission pulse and a negative pulse having a minimum width equal to the absolute value of the maximum width of the positive pulse at the downlink form of the single transmission pulse. In an embodiment, a signal communication apparatus comprises a transmitter adapted to transmit at least a signal, a receiver for receiving the signal and a wireless interface interposed between the transmitter and the receiver and comprising a transmitting antenna and a receiving antenna, said receiver comprising means for decoding the received signal. In an embodiment, said transmitter comprises four switches in a bridge configuration bonded between the supply voltage and the ground and having the middle points bonded to the transmitting antenna, said means of the transmitter being adapted to generate at the positive side of the clock signal a pulse of substantially the same duration as that of the current pulse to be transmitted, said pulse being at the input with the data signal and a demultiplexer comprising four AND ports, said demultiplexer being adapted to generate four signals for driving the switches according to the logic level of the data signal to be transmitted.

In an embodiment, a method for receiving a signal, said signal being transmitted in a coded way, comprises a step of controlling the decoding of the received signal if the value of the received signal is outside a logic hysteresis of a first logic threshold having a value smaller than the value of the direct current component of the received signal and a second logic threshold having a value greater than the value of the direct current component of the received signal. In an embodiment, said step of controlling comprises comparing said received signal to said first and second logic thresholds and generating logic signals if the value of said received signal is below said first logic threshold or above said second logic threshold. In an embodiment, said received signal is a differential signal with first and second components, said step of controlling comprising comparing the components of the differential signal received with said first logic threshold and said second logic threshold and generating logic signals if the value of every one of said components of the received differential signal is below said first logic threshold or above said second logic threshold, said step of controlling comprising generating pulses for triggering the decoding of the received signal if the generation of a logic signal due to the comparison of the first component of the differential signal with one of the first and second logic thresholds corresponds to the generation of a logic signal due to the comparison of the second component of the differential signal with the other of the first or second logic threshold. In an embodiment, said step of controlling comprises setting up a time period starting from the generation of the first pulse due to the generation of a first couple of logic signals, said step of controlling comprising checking if, within said time period, a second pulse is generated, following the first and due to the generation of a second couple of logic signals, and controlling the decoding of the received signal if the result of the check is positive.

In an embodiment, a receiver comprises: an input stage configured to receive a coded signal transmitted over a wireless interface and to output a differential signal based on the received coded signal, wherein the coded signal is coded by a pair of current pulses comprising a first coding pulse having a polarity and a second coding pulse having a polarity opposite of the polararity of the first coding pulse and a same duration and a same absolute amplitude as the first coding pulse; and a decoder coupled to the input stage and configured to decode the differential signal, the decoder including: a triggering block configured to: compare a first signal component of the differential signal to a first threshold above a direct current component of the differential signal and to a second threshold below the direct current component of the differential signal; compare a second signal component of the differential signal to the first threshold and the second threshold; generate a plurality of decoding logic signals based on the comparisons; and selectively trigger decoding based on an order of the generated plurality of decoding logic signals. In an embodiment, the triggering block is configured to trigger decoding when the order of the plurality of decoding logic signals indicates: the first signal component is above the first threshold while the second signal component is below the second threshold at a first instant; and within a period of time following the first instant, the first signal component is below the second threshold while the second signal component is above the first threshold. In an embodiment, the triggering block is configured to trigger decoding when the order of the plurality of decoding logic signals indicates: the second signal component is above the first threshold while the first signal component is below the second threshold at another instant; and within the period of time following the another instant, the second signal component is below the second threshold while the first signal component is above the first threshold. In an embodiment, the triggering block comprises a pulse generator configured to generate logic pulses based on the order of the plurality of decoding logic signals and a window generator configured to set up a time period starting from a generation of a first logic pulse by said pulse generator due to generation of a first set of decoding logic signals, said window generator configured to check whether within said time period a second logic pulse is generated, following the first and due to the generation of a second set of decoding logic signals, and to trigger said decoding of the differential signal when a result of the check is positive. In an embodiment, the decoder is configured to extract a clock signal and a data signal from the differential signal. In an embodiment, the decoder is configured to extract a clock signal and a data signal from the differential signal and the pulse generator comprises two AND ports configured to receive the first and second sets of decoding logic signals and to output the first and second logic pulses and said window generator comprises a first latch having an input configured to receive the first logic pulse and a second latch having an input configured to receive the second logic pulse, wherein the first and second latches are configured to receive a signal corresponding to said time period as a reset signal, and to output triggering pulses to trigger the decoding when both the first and the second logic pulses are present at the respective inputs of the latches. In an embodiment, the coded signal is coded using a plurality of pairs of current transmission pulses, each having a form of a Gaussian type.

In an embodiment, a system comprises: an antenna configured to receive coded signals; and a decoder coupled to the antenna and configured to decode received coded differential signals, wherein the coded signals are coded by pairs of current pulses, each pair comprising a first coding pulse and a second coding pulse having a polarity opposite of a polarity of the first coding pulse and a same duration and a same absolute amplitude as the first coding pulse, the decoder including a triggering block configured to: compare a first signal component of a differential signal to a first threshold above a direct current component of the differential signal and to a second threshold below the direct current component of the differential signal; compare a second signal component of the differential signal to the first threshold and the second threshold; generate a plurality of decoding logic signals based on the comparisons; and selectively trigger decoding based on an order of the generated plurality of decoding logic signals. In an embodiment, the system further comprises an input stage coupled between the antenna and the decoder and configured to output the differential signal based on a received differential signal. In an embodiment, the system further comprises: a transmitter configured to code signals for transmission. In an embodiment, the antenna is a first antenna of a wireless interface, the wireless interface comprising a second antenna coupled to the transmitter. In an embodiment, the transmitter is configured to code a data signal to be sent and a clock signal. In an embodiment, said transmitter comprises four switches in a bridge configuration coupled between a supply voltage and a ground and having middle points coupled to the second antenna, said transmitter configured to generate at a positive side of a clock signal a pulse of substantially a same duration as that of a current pulse to be transmitted, said pulse being at an input with a data signal of a demultiplexer comprising four AND ports, said demultiplexer configured to generate four signals for driving the switches according to a logic level of the data signal to be transmitted. In an embodiment, the triggering block is configured to trigger decoding when the order of the plurality of decoding logic signals indicates: the first signal component is above the first threshold while the second signal component is below the second threshold at a first instant; and within a period of time following the first instant, the first signal component is below the second threshold while the second signal component is above the first threshold. In an embodiment, the triggering block comprises a pulse generator configured to generate logic pulses based on the order of the plurality of decoding logic signals and a window generator configured to set up a time period starting from a generation of a first logic pulse by said pulse generator due to generation of a first set of decoding logic signals, said window generator configured to check whether within said time period a second logic pulse is generated, following the first and due to the generation of a second set of decoding logic signals, and to trigger said decoding of the differential signal when a result of the check is positive.

In an embodiment, a method comprises: comparing a first signal component of a differential signal to a first threshold above a direct current component of the differential signal and to a second threshold below the direct current component of the differential signal, wherein the differential signal is coded with a first signal pulse having a polarity, a duration and an amplitude and a second signal pulse having a polarity opposite of the first signal pulse, a same duration as the first signal pulse and a same absolute amplitude as the first signal pulse; comparing a second signal component of the differential signal to the first threshold and the second threshold; generating a plurality of decoding logic signals based on the comparisons; and controlling decoding of the differential signal based on an order of the generated plurality of decoding logic signals. In an embodiment, the controlling decoding comprises triggering decoding when the order of the plurality of decoding logic signals indicates: the first signal component is above the first threshold while the second signal component is below the second threshold at a first instant; and within a period of time following the first instant, the first signal component is below the second threshold while the second signal component is above the first threshold. In an embodiment, the controlling decoding comprises: generating a first set of decoding logic signals based on the comparing; generating a second set of decoding logic signals based on the comparing; generating a first logic pulse signal based on the first set of decoding logic signals; generating a second logic pulse signal based on the second set of decoding logic signals; and enabling decoding based on the first and second logic pulse signals. In an embodiment, the enabling decoding comprises enabling decoding based on a timing of the first and second logic pulse signals. In an embodiment, enabling decoding comprises determining whether a pulse of the second logic pulse signal occurs within a time period after a pulse of the first logic pulse signal.

In an embodiment, a system comprises: means for decoding differential signals coded with a first signal pulse having a polarity, a duration and an amplitude and a second signal pulse having a polarity opposite of the first signal pulse, a same duration as the first signal pulse and a same absolute amplitude as the first signal pulse; means for comparing each of two signal components of coded differential signals to first and to second logic thresholds, the first logic threshold having a value larger than a value of a direct current component of the differential signals and the second logic threshold having a value smaller than the value of the direct current component of the differential signals; and means for controlling the means for decoding based on the comparisons. In an embodiment, the system further comprises: means for receiving coded differential signals coupled to the means for decoding; means for transmitting coded differential signals; and means for coupling the means for transmitting to the means for receiving. In an embodiment, the means for coupling the means for transmitting to the means for receiving comprises means for galvanically isolating the means for transmitting from the means for receiving. In an embodiment, the means for controlling comprises: means for generating a first plurality of decoding logic signals based on the comparisons; means for generating a second plurality of decoding logic signals based on the comparisons; means for generating a first logic pulse signal based on the first plurality of decoding logic signals; means for generating a second logic pulse signal based on the second plurality of decoding logic signals; and means for enabling decoding based on the first and second logic pulse signals. In an embodiment, the means for enabling comprises means for determining whether a pulse generated by the means for generating a second logic pulse signal occurs within a time period after a pulse generated by the means for generating a first logic pulse signal.

BRIEF DESCRIPTION OF THE SEVERAL VIEWS OF THE DRAWINGS

The features and advantages of some embodiments of the present disclosure will be apparent from the following detailed description of a practical embodiment thereof, shown by way of non-limiting example in the accompanying drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, decoders and encoders, are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

A problem of structures with coupled inductors is the presence of parasite capacitances between the inductors themselves. These capacitances introduce an unwanted capacitive coupling between the turns thus causing currents (proportional to the parasite capacitances according to the formula)

$$I = C\frac{dv}{dt}$$

at potential variations between the transmission and reception circuits.

The faster the potential variation, the higher these currents are (they may also be of the order of tens of kV/us) and the input impedance being non-null, they change the polarization of the receiver circuits thus causing the loss of data and possibly the breakage thereof. This phenomenon is commonly referred to as noise due to a common-mode transient.

The turns of said galvanically isolated interfaces have electric features similar to those of a transformer and therefore the transmitting turn may be denoted as primary and the receiving turn may be denoted as secondary.

Figure 1:
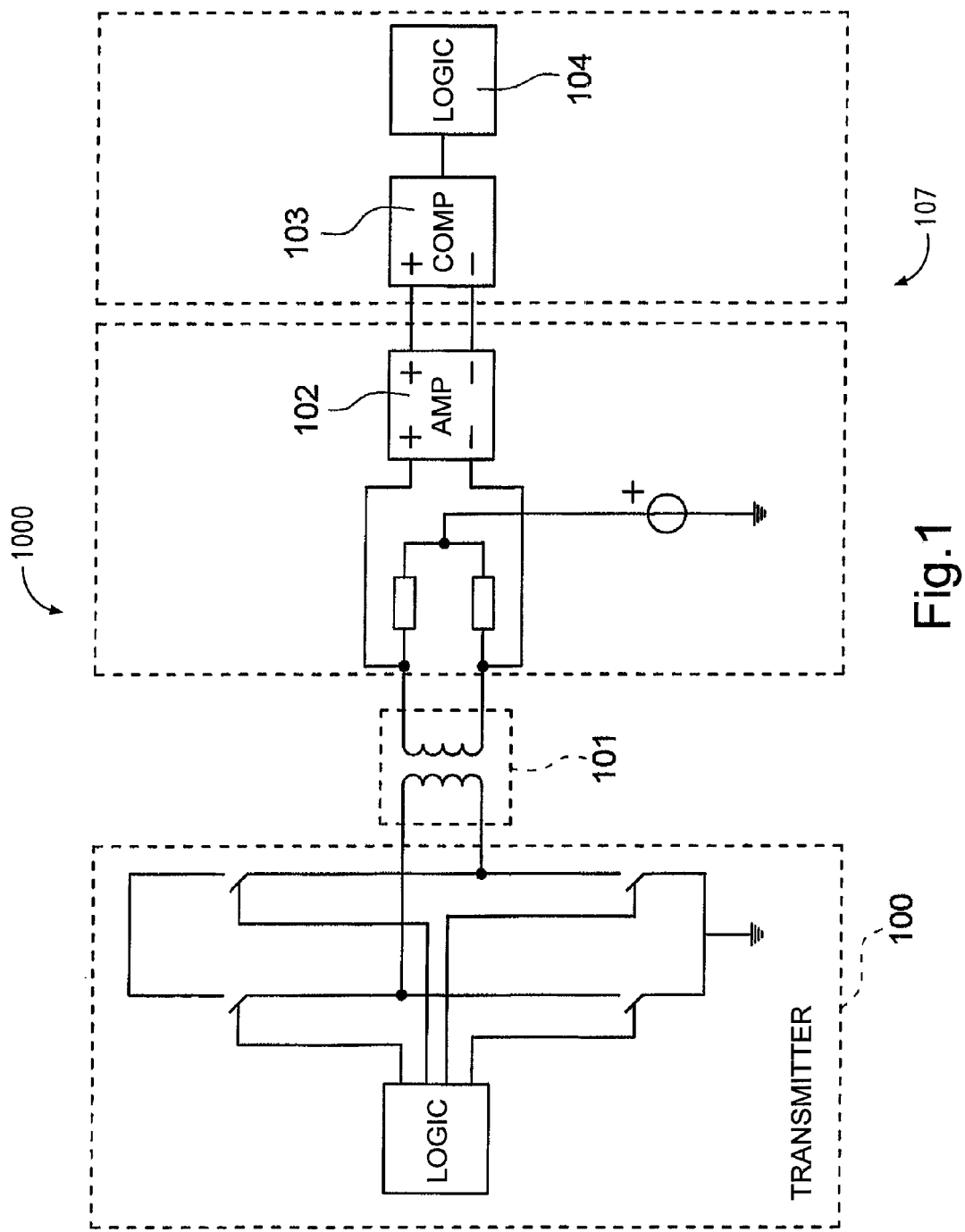
FIG. 1 shows a communication system with a galvanic isolation interface in a differential configuration both to the primary and to the secondary.
Figure 2:
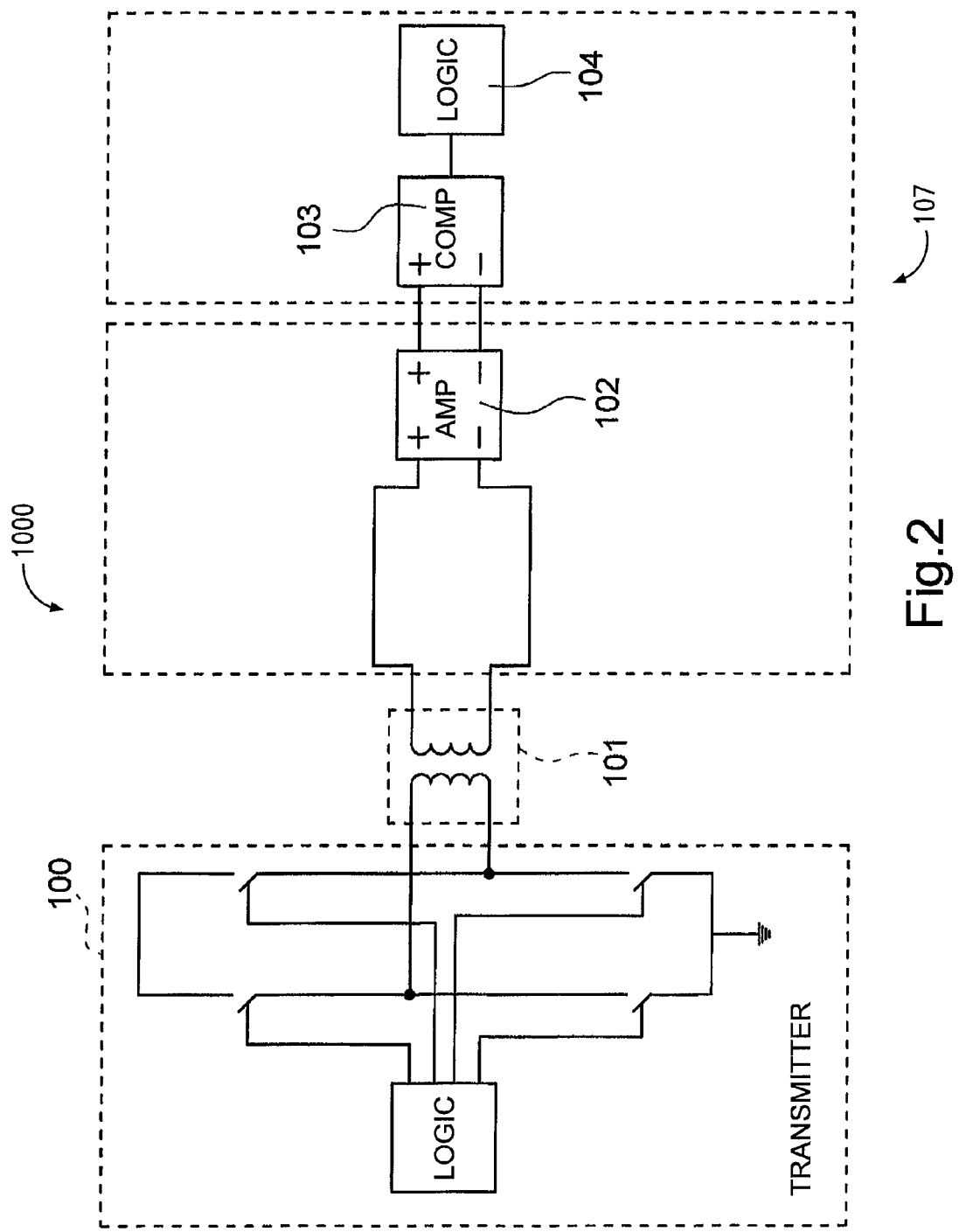
FIG. 2 shows a communication system with a current amplifier.

The data transmission through the primary and the secondary is usually achieved using a modulated radiofrequency signal or by sending current pulses. Circuit diagrams of typical transmitter-receiver architectures 1000 in which microantennas are used, is shown in FIGS. 1 and 2 (in these figures the microantennas are schematized as inductors). The transmitter-receiver system comprises a transmitter 100, an interface 101, and a receiver 107 comprising an amplifier 102, a comparator 103 and a logic circuitry 104.

The diagrams shown display a differential architecture both to the primary and to the secondary, such a solution permits to obtain a higher immunity to common-mode disturbances. According to a variation of the shown diagram, one or both the inductors have a terminal each referred to its ground GND.

Figure 3:
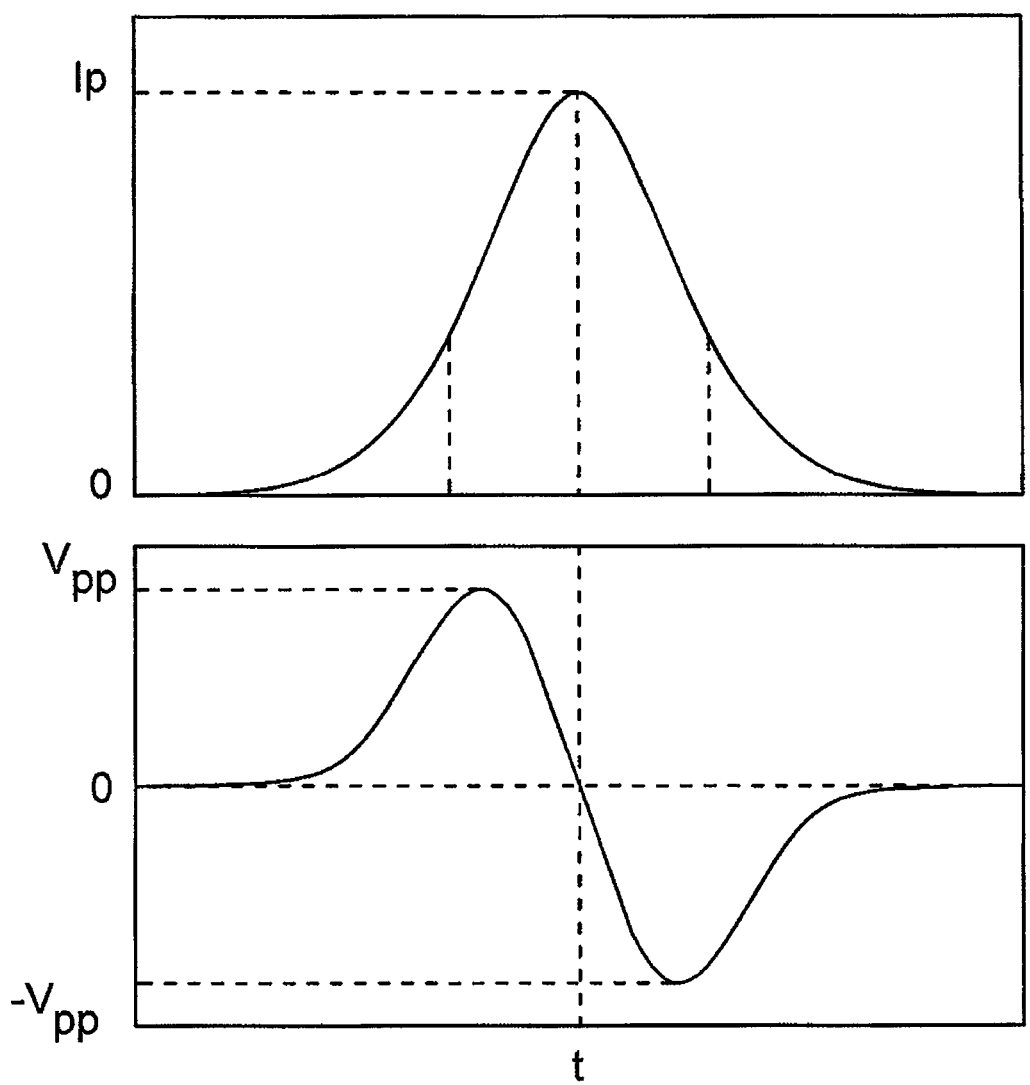
FIG. 3 shows the waveform of a current pulse transmitted by the primary and the corresponding waveform of the signal received at the secondary.

In order to better understand how this type of architecture may be exploited to transmit information, it is useful to observe the waveforms related to the transmission of a current pulse Ip through coupled inductors, as seen in FIG. 3.

The voltage at the receiver has a positive pulse with a maximum width Vpp followed by a negative one with a minimum width −Vpp, when the current pulse Ip to the transmitter is positive and vice versa if the current pulse is negative. Therefore, by associating information with the current pulse orientation, data may be transmitted through the isolation interface.

A typical coding/decoding technique involves associating a positive (negative) current pulse with a positive (negative) side of a logic signal, as described in US Patent Publication No. 2008/0069249. The signal received at the secondary is amplified before being decoded; if the coupling coefficient of the two inductors is sufficiently great, the signal at the secondary may have a sufficiently wide width to permit the decoding without using the amplifier stage. Using current pulses for transmitting the signal permits to decrease the system consumptions and increase the transmission bit rate. Furthermore, by exploiting both pulses at the secondary, the signal transmission may be strengthened thus making the decoding more reliable.

By generating a transmission current pulse with a convenient Gaussian form, a waveform may be obtained at the secondary with pulses of the desired duration thus minimizing the system current consumptions. The used technology imposes a limit lower than the pulse duration, as the band of the received signal being inversely proportional to the duration of the transmitted pulse, it is necessary to prevent it from urging the resonance frequency of the receiver (basically depending on parasites).

Furthermore if the pulse duration is lower than or comparable to the time constant of the inductor (depending on its inductance and parasite series impedance), the received signal will have the second pulse more weakened than the first, which represents a limitation from the point of view of the strength of the system in the presence of disturbances. Indeed, noises injected into the receiver from close circuits which are particularly noisy (due to an imperfect symmetry in the layout of the differential circuits) may be detected as pulses from the transmitter and therefore erroneously decoded. This problem may be obviated by duplicating the information, i.e., by transmitting two consecutive pulses which code the same data and minimizing the possibility that the noise pulse is decoded as valid, but this results in decreasing the maximum bit rate. Therefore, the optimal duration of the pulse is typically higher than the typical time constant of the inductor and such that the received signal does not urge the typical resonance frequency of the receiver.

Figure 4:
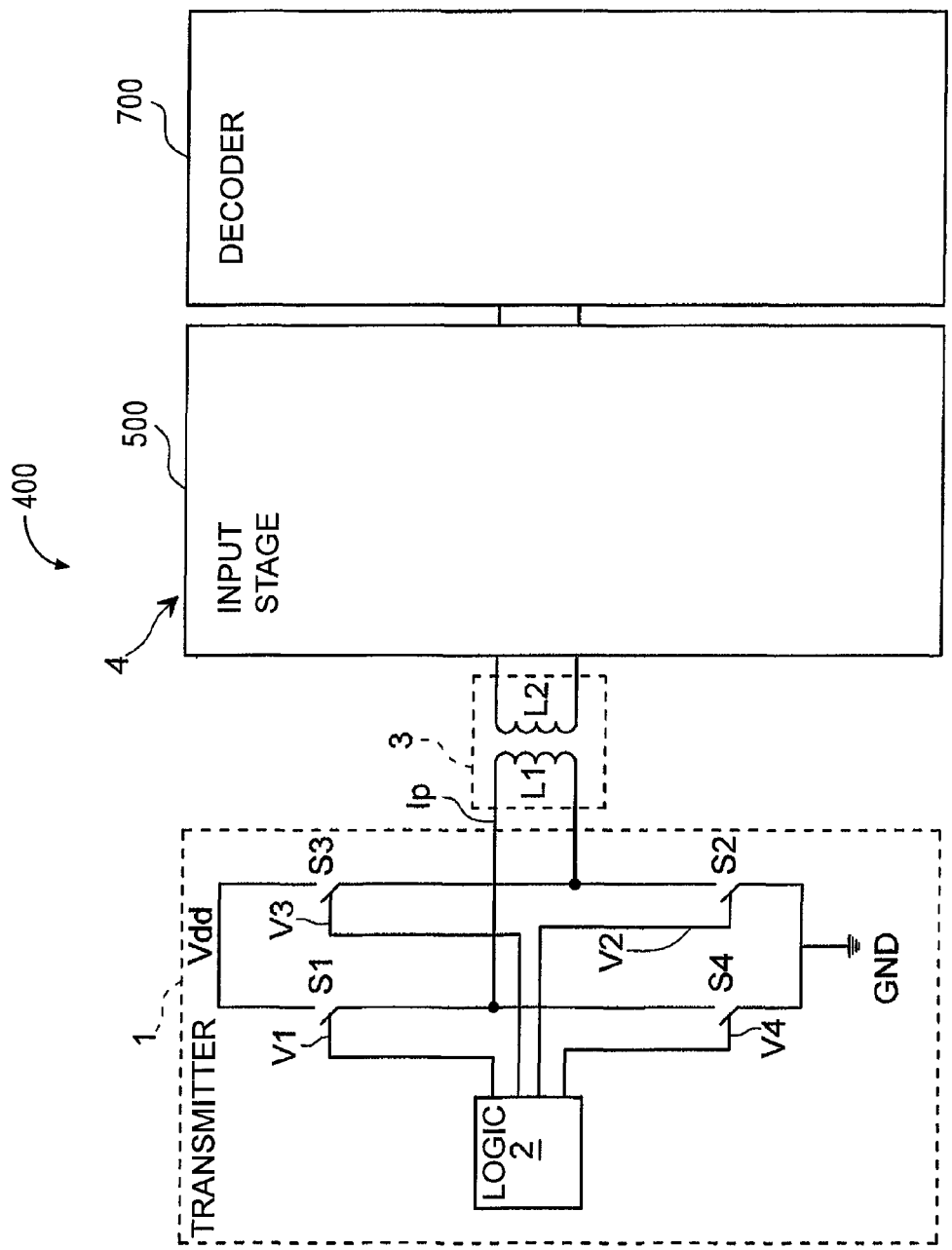
FIG. 4 shows a communication system with a galvanic isolation interface in accordance with an embodiment.

FIG. 4 shows an embodiment of a communication system 400 with a galvanic isolation interface in accordance with the present disclosure. Said system is of the differential type both in transmission and in reception but it may also be of the non-differential type. The system comprises a transmitter 1 with a logic circuitry 2 receiving at the input the data to be transmitted and the synchronizing signal (clock) and generates a coded signal, preferably, at the clock sides, a current pulse Ip as shown in FIG. 3. The pulse direction denotes the logic level of the data to be transmitted. The transmitter comprises four switches S1-S4, S2-S3 in a bridge configuration bonded between the voltage Vdd and the ground GND and having the middle points bonded to the primary L1, i.e., to the transmitting antenna or turn of the integrated, galvanic isolation interface 3, which may be of the wireless type. The switches are driven by the logic circuitry 2 by means of the signals V1-V4; the logic circuitry 2 is adapted to switch off the switches S1, S2 to generate the current pulse Ip which codes data at a high (or low) logic level and the switches S3, S4 for coding data at a low (or high) logic level. By conveniently controlling the signal sides V1-V4, the waveform of the current pulse Ip may be modeled such that it approximates a Gaussian pulse with the desired duration, as described in FIG. 3.

Figure 5:
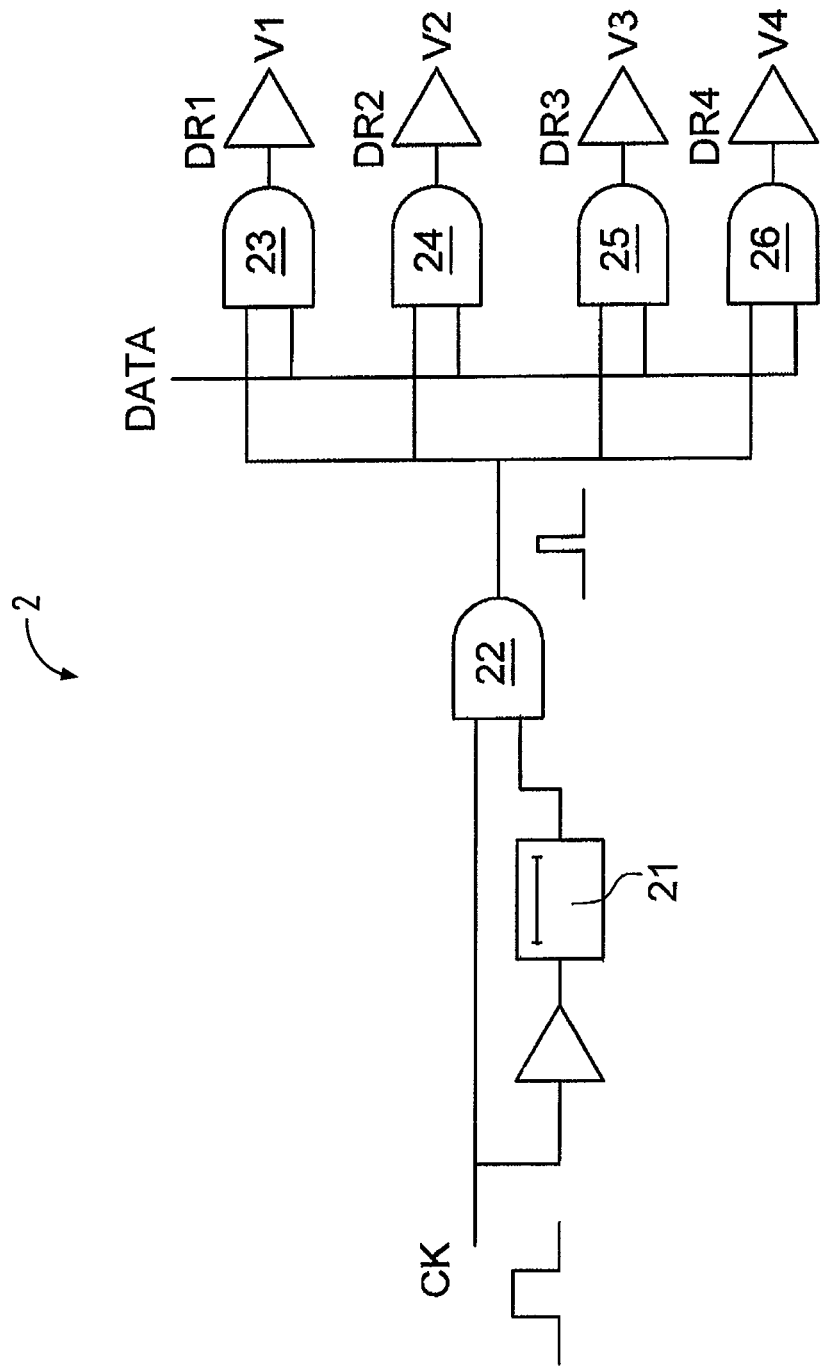
FIG. 5 shows a diagram of the logic circuitry of an embodiment of the communication system transmitter in FIG. 4.

A possible implementation of the logic circuitry 2 of the transmitter is shown in FIG. 5. At the positive side of the clock signal CK, a pulse of about the same duration as the current pulse to be transmitted is generated, through the delay cell 21 and the AND-type logic port 22. The signal at the output of the AND port 22 is sent to four AND ports 23-26 also having at the input the data signal DATA, the AND ports 23-26 implement a demultiplexer generating four signals according to the logic level of the data to be transmitted. These signals are at the input of four drivers DR1-DR4 which generate the signals V1, V2, V3, V4 for driving the switches S1-S4. The four drivers DR1-DR4 are conveniently dimensioned to generate the Gaussian current pulse Ip. In the absence of transmission, the switches S2 and S4 may be switched off, this ensures that in the presence of common-mode transients between the primary winding L1 and the secondary winding L2, i.e., the receiving antenna or turn of the interface 3, the currents flowing are "conveyed" towards the ground GND. The turns L1 and L2 have electric features similar to those of a transformer.

The system comprises a receiver 4, which as illustrated has an input stage 500 which amplifies the signal Ir present on the secondary L2 of the interface 2; if the transmitted signal is the signal Ip, the signal Ir has a positive pulse with a maximum width Vpp followed by a negative pulse with a minimum width −Vpp, when the current pulse Ip to the transmitter is positive and vice versa if the current pulse is negative. The receiver 4 is provided with a decoder 700 which decodes the received pulses and reassembles the data signal DATA and the clock signal CK.

In accordance with a first embodiment, the input stage 500 comprises a circuit for rejecting the common-mode transients, i.e., adapted to decrease the input impedance in the presence of parasite currents due to a common-mode transient and therefore adapted to compensate for the parasite currents flowing between the transmitting turn and the receiving turn at the potential variations between the input and the output of the galvanic isolation interface.

One approach for implemented the input stage 500 comprises amplifying the currents outputted from the secondary. Another approach comprises amplifying the voltage at its ends.

Figure 6A:
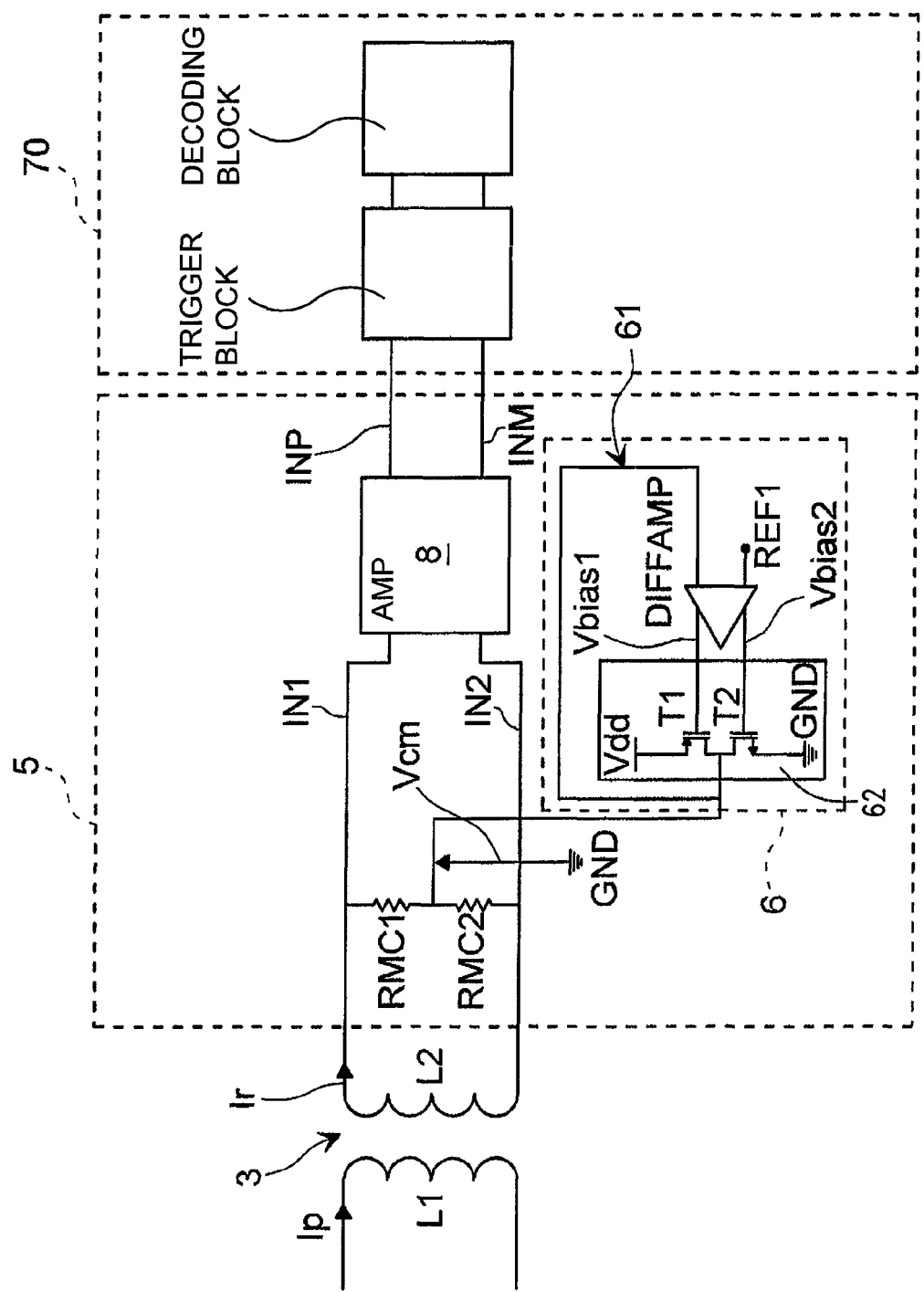
FIG. 6a shows an embodiment of a receiver for a communication system in accordance with a first embodiment of the disclosure.

In accordance with a first embodiment, FIG. 6a shows an input stage 5 and a decoder 70 suitable for use, for example, as the input stage 500 and the decoder 700 of the embodiment of FIG. 4. As illustrated in FIG. 6a, at the input stage 5 to the differential received signal Ir, a common-mode component is added so as to polarize the amplifier through the resistors RMC1 and RMC2 and the output Vcm of a common-mode voltage generator circuit 6 for rejecting the common-mode transients. The circuit 6 provides the voltage Vcm at the output, between the common terminal of the two resistors RMC 1 and RMC2 and the ground GND, adjusted to the reference value REF1 and configured to compensate for the parasite currents flowing between the primary L1 and the secondary L2 of the interface 3 at the potential variations between input and output of the galvanic isolation interface. As illustrated in FIG. 6a, the decoder 70 may comprise trigger and decoding blocks.

Circuit 6 may comprise a closed-loop buffer 61 but an open-loop buffer or any other solution may also be used. The closed-loop buffer 61 comprises a differential stage DIFFAMP driving the output stage 62 comprising the series of two transistors T1 and T2, arranged between the supply voltage Vdd and the ground GND, configured to provide (or take up) the currents due to the parasite effects; the signals Vbias1 and Vbias2 from the differential stage DIFFAMP drive the PMOS transistor T1 and the NMOS transistor T2, respectively. The voltage Vcm is the voltage on the common output terminal of the transistors T1 and T2 and the differential stage has the voltage Vcm on the inverting input terminal and the voltage REF1 on the non-inverting input terminal.

Figure 6B:
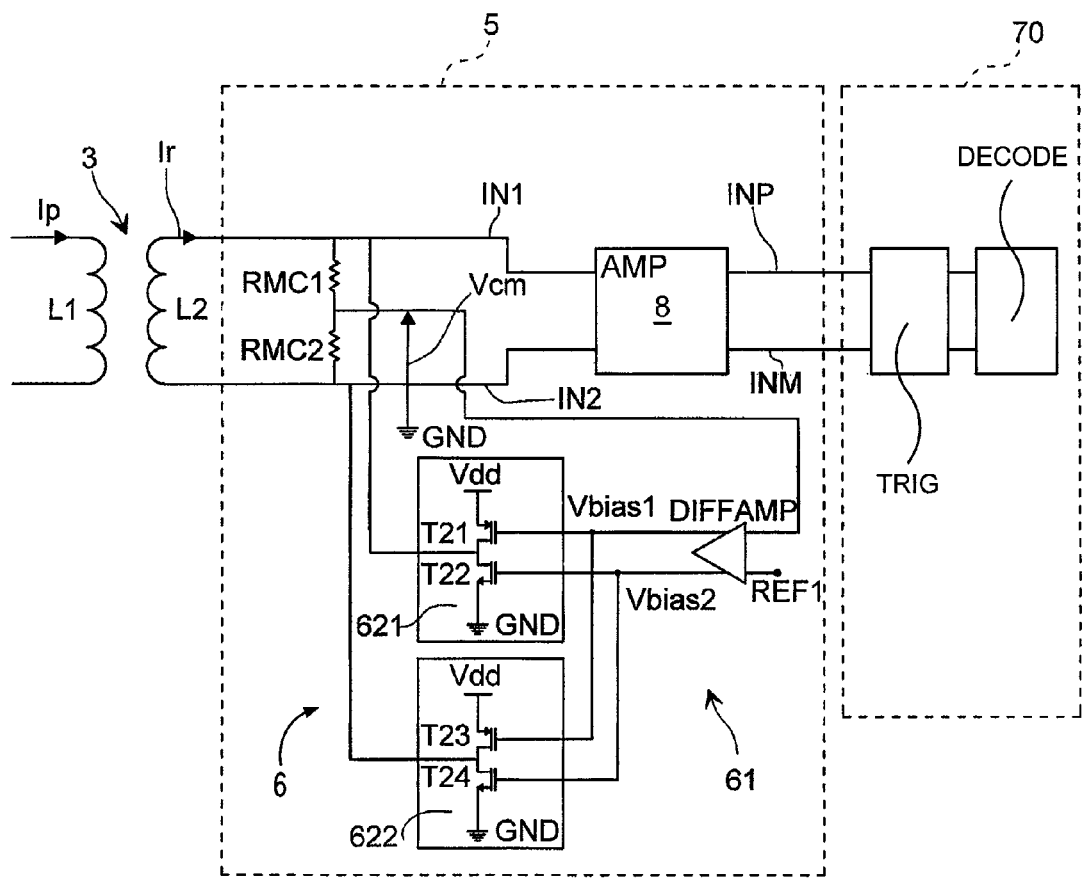
FIG. 6b shows an embodiment of a receiver for a communication system in accordance with a variation of the first embodiment of the disclosure.

In accordance with a variation of the first embodiment of the present disclosure shown in FIG. 6b, circuit 6 comprises a buffer 61 comprising a differential stage DIFFAMP driving two output stages 621 and 622, each comprising a series of two transistors T21, T22 and T23, T24, arranged between the supply voltage Vdd and the ground GND, capable of providing (or taking up) the currents due to the parasite effects; the signals Vbias1 and Vbias2 from the differential stage DIFFAMP drive the PMOS transistor T21, T23 and the NMOS transistor T22, T24, respectively. The voltage Vcm is the voltage on the common terminal of the resistors RMC1 and RMC2. The differential stage has the voltage Vcm on the inverting input terminal and the voltage REF1 on the non-inverting input terminal and the outputs of the two stages 621 and 622 are bonded to the terminals of the inductance L2.

Input stage 5 comprises an amplifier 8 which may be implemented in different ways; in general, its function is amplifying the high frequency components of the signal Ir by keeping the direct current component unaltered.

Figure 7:
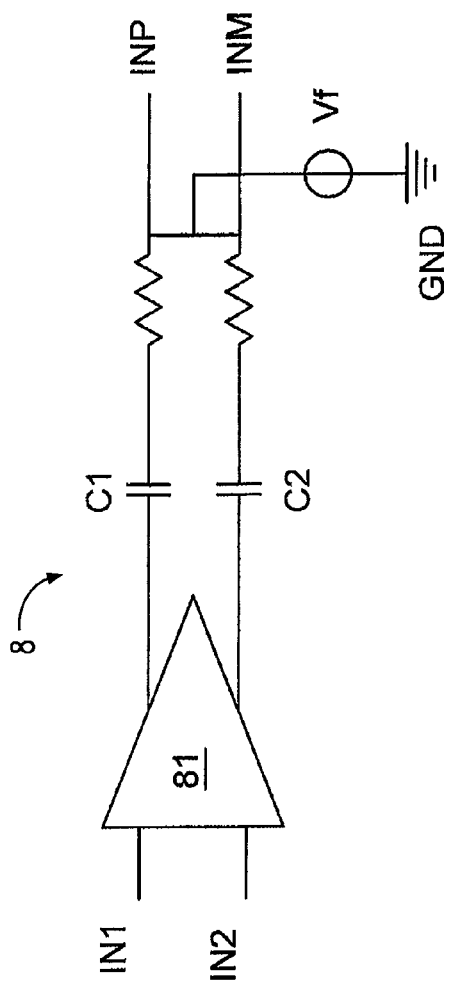
FIG. 7 shows a circuit implementation of an embodiment of an amplifier in FIG. 6a or 6b.

A first implementation of the amplifier 8, shown in FIG. 7, comprises a wideband-voltage differential amplifier 81 with a cut-off frequency of about 2 fp, with fp being a band-centre frequency of the signal Ir received at the secondary L2 and at the input of the terminals IN1 and IN2. The output direct current component on the terminals INP and INM is filtered through the capacitances C1 and C2 and applied again through the tension generator Vf to permit the correct polarization of the circuit downstream of the amplifier.

Figure 8:
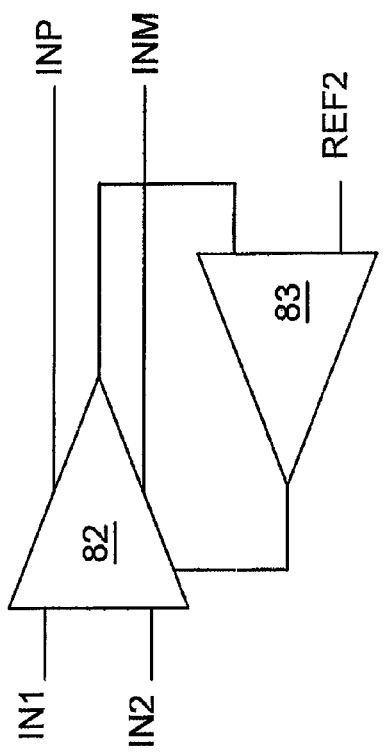
FIG. 8 shows another circuit implementation of an embodiment of an amplifier in FIG. 6a or 6b.

A second implementation of the amplifier 8, shown in FIG. 8, comprises a fast comparator 82 fed back with an error amplifier 83 which resets the offset of the signal Ir at the input of the terminals IN1 and IN2 and keeps the direct current component of the signal at the output on the terminals INP and INM at a value to polarize the circuit downstream of the amplifier. The error amplifier 83 is adapted to compare the signal at the output of the fast comparator 82 to a reference signal REF2.

Figure 9:
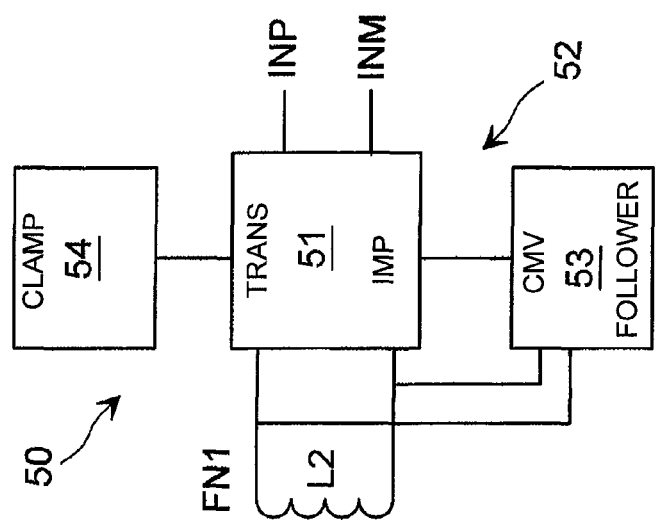
FIG. 9 shows a block diagram of an embodiment of an input stage of the receiver in FIG. 6a or 6b in accordance with a variation of the first embodiment of the disclosure.

In accordance with another variation of the first embodiment of the disclosure, if the signal to be amplified on the secondary L2 is a current signal, a current amplifier circuit is used. FIG. 9 describes a different input stage 50 usable for example in an embodiment of the receiver in FIG. 4 and may be considered as a variation of the input stage 500 of FIG. 4. It comprises a transimpedance stage 51 to amplify the current signal Ir received and present on the secondary L2 and from a stage 52 for rejecting the noises due to the common-mode transients. In particular, the rejection stage 52 comprises a clamp circuit 54 which takes up the inputting currents and from a common-mode voltage follower 53 adapted to modify the polarization of the transimpedance stage 51 in order to balance the effect of the parasite currents.

Figure 10A:
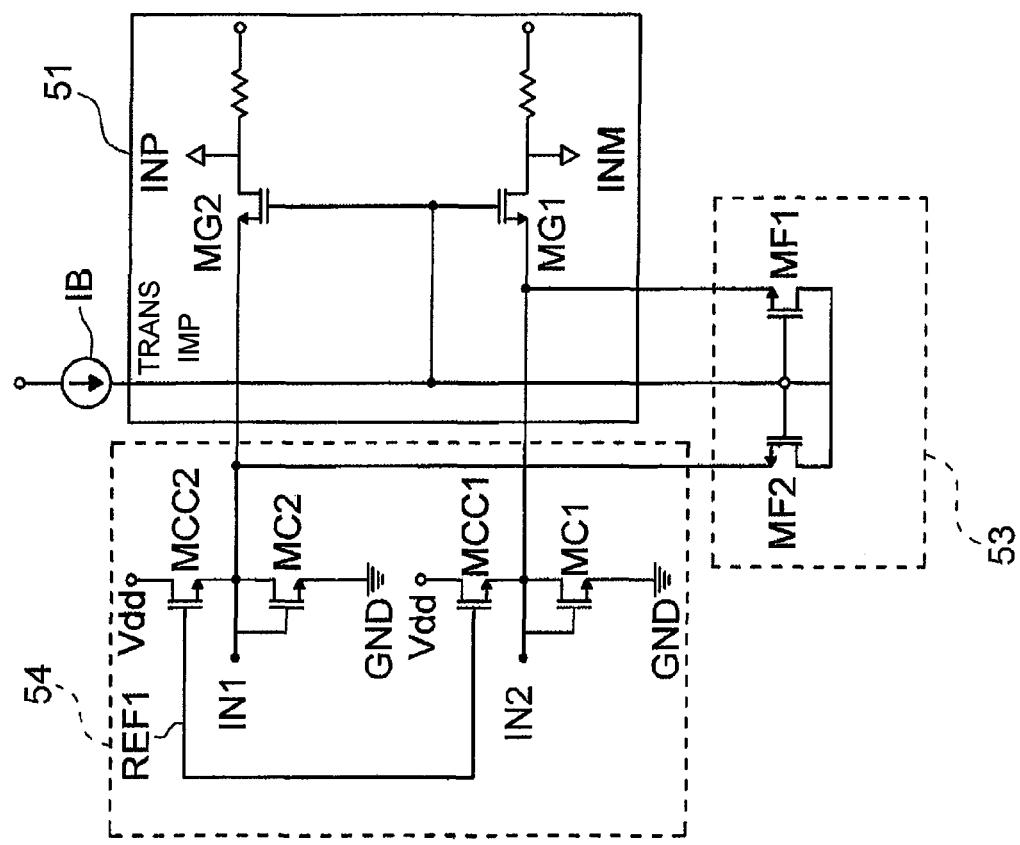
FIG. 10a is a circuit diagram of an embodiment of the input stage in FIG. 9.

The transimpedance stage 51, as better seen in FIG. 10a, comprises MOS transistors MG1 and MG2 which are polarized in a common-gate configuration. The clamp circuit 54 has the MOS transistors MC1 and MC2 taking up the common-mode currents inputted from the terminals of the secondary L2 and the MOS transistors MCC1-MCC2 providing the currents outputted from the abovementioned terminals. In some embodiments, the presence of the clamp circuit 54 only may not to be sufficient to oppose the effect of the currents due to the common-mode transients; for such a reason stage 53 has been added, permitting to dynamically modify the polarization of the transistors MG1-MG2 to increase the current they dispense towards the input terminals IN1 and IN2. The input terminals IN2 and IN1 are bonded to respective source terminals of the transistors MG1 and MG2, respective gate and drain terminals of MOS transistors MC1 and MC2, and respective source terminals of the transistors MF1 and MF2 belonging to stage 53. The latter comprises the differential stage of the two transistors MF1 and MF2 having the gate and drain terminals in common. The MOS transistors MC1 and MC2 have the source terminals bonded to the ground GND and the drain terminals bonded to the respective source terminals of the transistors MCC1-MCC2 having the drain terminals bonded to a supply voltage VDD and the gate terminals bonded to the reference voltage REF1. The drain terminals of the transistors MG1 and MG2 are the output terminals INP and INM of the amplifier circuit 50; a polarization current IB is sent to the common gates of the transistors MG1-MG2 and MF1-MF2.

Figure 10B:
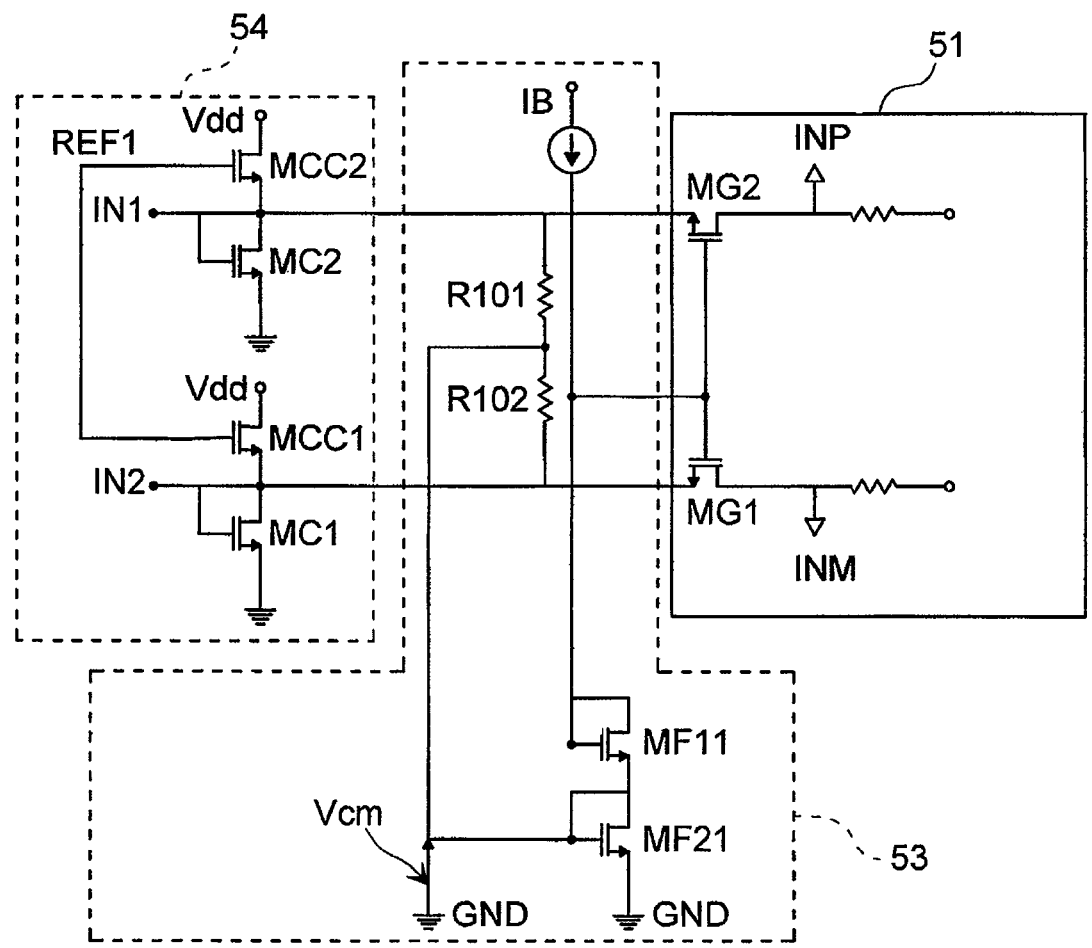
FIG. 10b is another circuit diagram of an embodiment of the input stage in FIG. 9.

In an alternative embodiment, as seen in FIG. 10b, stage 53 may be obtained by the series of two resistors R101 and R102 bonded between the terminals IN1 and IN2 and the series of two transistors MF11 and MF21 having the drain terminals bonded to the respective gate terminals and the source terminal of the transistor MF21 bonded to the ground GND and the drain terminal bonded to the source terminal of the transistor MF11 having the drain terminal bonded to the polarization current generator IB and the gate terminals of the transistors MG1 and MG2. The common-mode voltage Vcm is on the gate terminal of the transistor MF21.

Referring to FIG. 4, the signal at the output of the input stage 500 is sent to a decoder 700, which may be of a known type for decoding the received signal.

Figure 11:
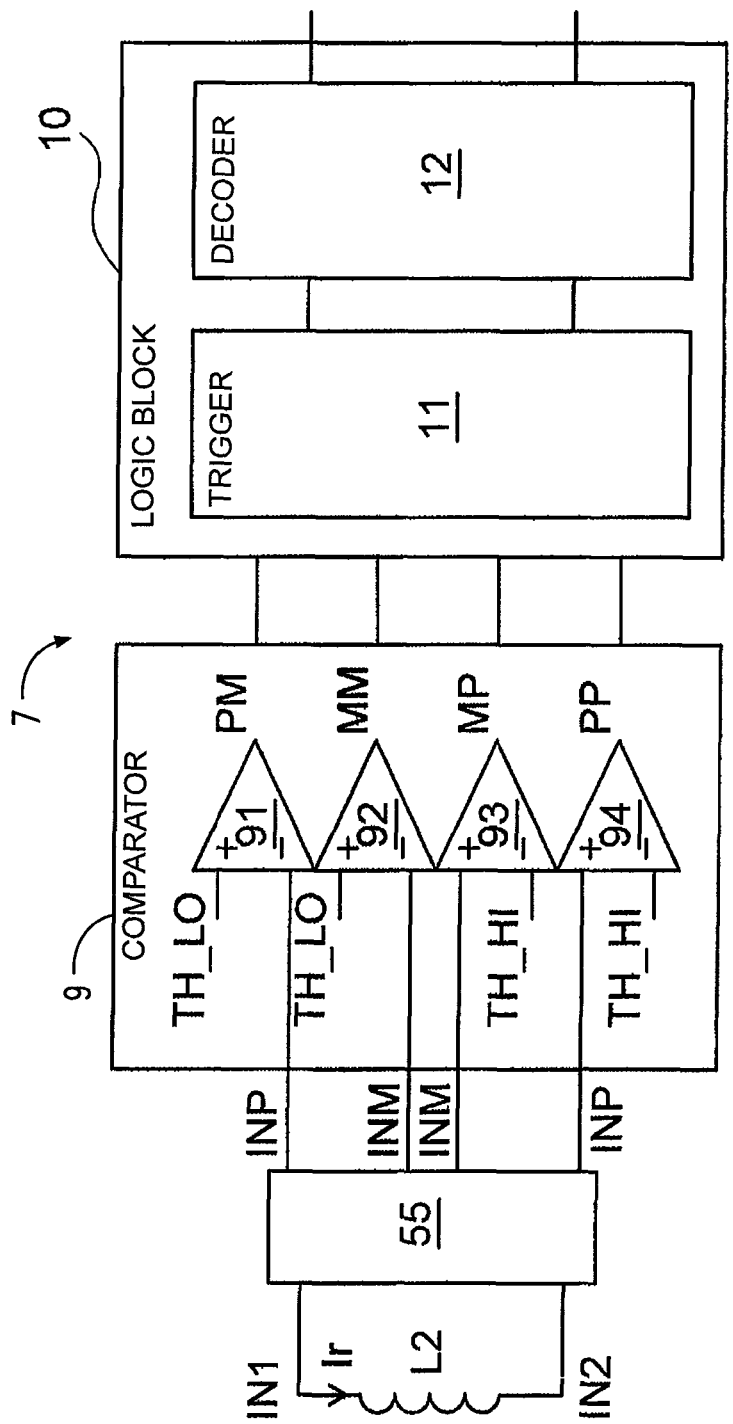
FIG. 11 shows an embodiment of a receiver for a communication system in accordance with a second embodiment of the disclosure.

In accordance with a second embodiment of the disclosure, the signal Ir present on the receiving turn L2 and amplified by an amplifier 55 of the known type is sent through the terminals INP and INM to a discriminator stage 7 adapted to decode the received signals, as shown in FIG. 11. Discriminator stage 7 may be employed, for example, as the decoder 700 of an embodiment of the system shown in FIG. 4. If amplifying the signal Ir present on the turn L2 is not required, the inputs INP and INM of the discriminator 7 match with the terminals IN1 and IN2 of the turn L2.

Said discriminator 7 comprising means 9, 11 capable of triggering decoding means 12 of the received signal only if the value of the waveform of the received signal Ir is outside a logic hysteresis consisting of a first logic threshold (TH_LO) having a value smaller than the value of the direct current component Irdc of the received signal and a second logic threshold (TH_HI) having a value greater than the value of the direct current component of the received signal.

The discriminator stage 7 comprises a comparator stage 9 and a logic block 10. If the signal Ir is a differential signal, the comparator stage 9 comprises four comparators 91-94 adapted to turn the pulses of the differential signal Ir at the input through the terminals INP and INM into four logic pulses PM, MM, MP and PP by comparing the input signals to the reference logic thresholds TH_LO and TH_HI, the threshold THLO of which has a value smaller than the direct current component of the differential signals INP and INM, while the threshold TH_HI has a value greater than the direct current component of the signals INP and INM. Thereby, a voltage range is targeted within which the signal variations are ignored. By conveniently adjusting these thresholds, a part of the noise at the input of the receiver or possibly introduced by the amplifier itself may be filtered. The logic block 10, according to the order of reception of the signals PM, MM, MP and PP, decodes the data and generates an output clock which is synchronous with the decoded data.

Figure 12:
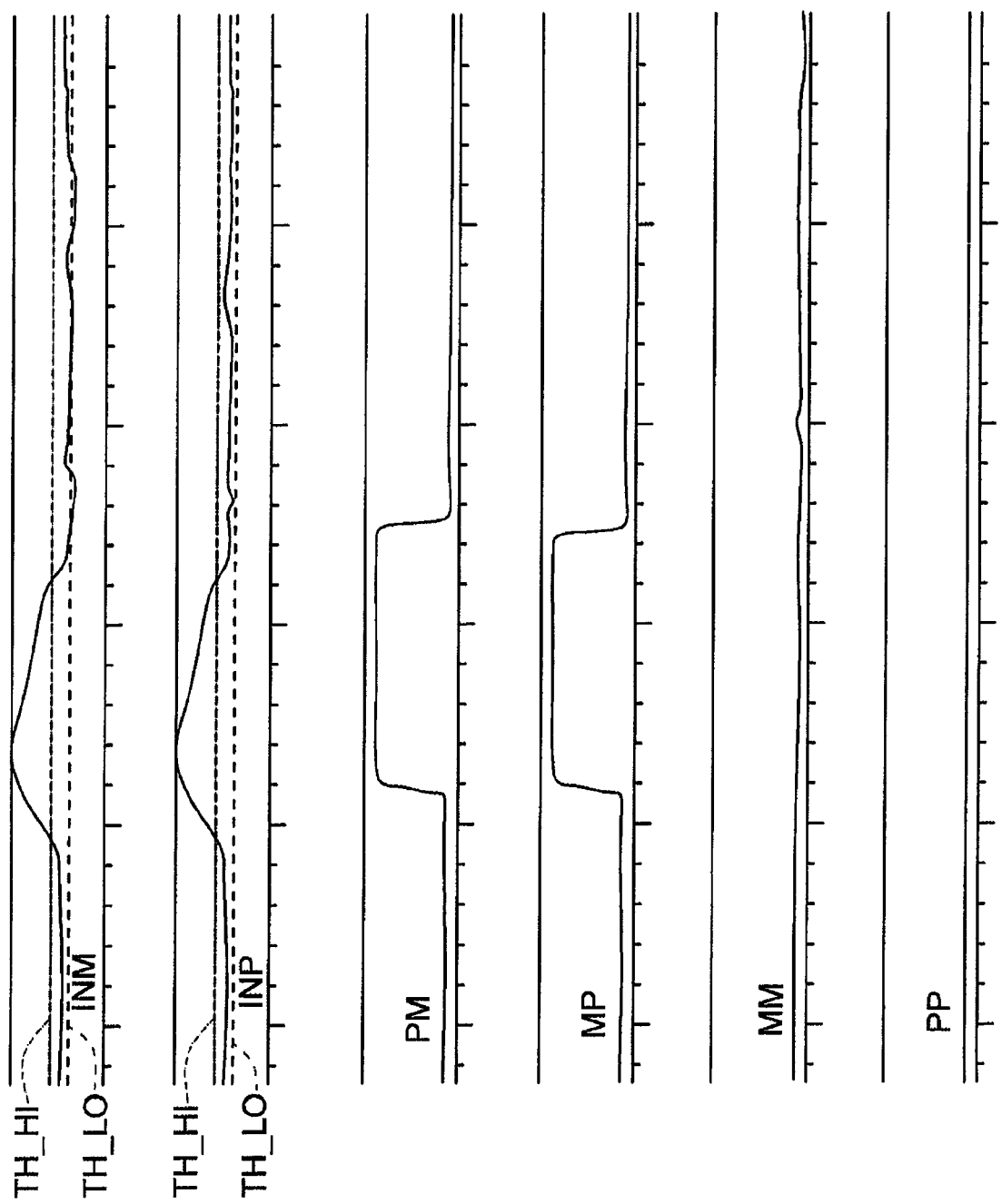
FIG. 12 shows the time diagrams of the signals involved in the comparator block of the discriminator in FIG. 11 in the presence of disturbances.

However, this expedient may not be enough to avoid possible disturbances from being interpreted as useful signals. Indeed, a common-mode noise could be introduced from the outside of the amplification chain through the ground or power supply or due to an imperfect symmetry of the layout of the differential circuits. If the width of this noise is such that both the signal INP and the signal INM are either above or below the thresholds, the comparators 91-94 switch and thus generate logic signals that could be interpreted as a useful signal, as seen in FIG. 12. For this reason, performing a time sequence control of the logic signals may be used to filter a possible disturbance.

The discriminator 7 and in particular the logic block 10 is further capable of targeting possible spurious input signals caused by disturbances. Indeed, if the sequence of the received pulses does not meet the predicted order, the received data and the corresponding clock may be considered invalid and thus ignored.

Figure 13:
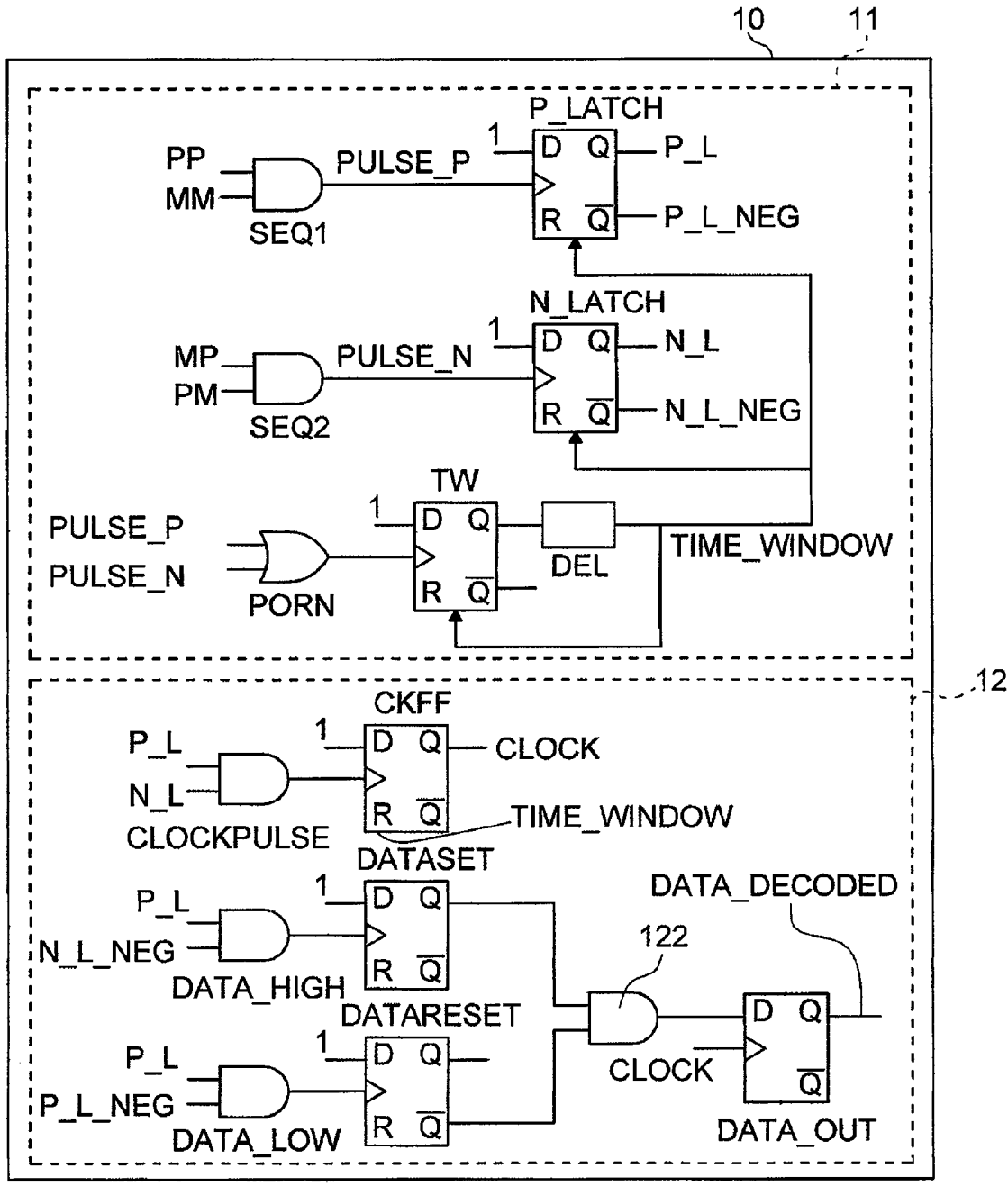
FIG. 13 shows a more detailed logic block of an embodiment of the discriminator in FIG. 11.

In an embodiment, the logic block 10 comprises other means SEQ1, SEQ2 adapted to allow pulses to be generated for decoding the received signal only if the generation of a logic signal due to the comparison of the first component INP of the differential signal with one of the first logic threshold TH_LO or the second logic threshold TH_HI corresponds to the generation of a logic signal due to the comparison of the second component INM of the differential signal with the other of the first or second logic threshold. Indeed, the logic circuit 10 comprises a trigger circuit 11 which comprises, in turn, as shown in FIG. 13, two AND logic ports SEQ1 and SEQ2 having at the input the signals PM, MM, MP and PP and having at the output logic pulses PULSE_P and PULSE_N only if the sequence is that shown in FIG. 14. Otherwise, if there is a disturbance, as shown in FIG. 12, the output of the AND port SEQ1 remains zero.

Furthermore the presented system introduces a further grade of disturbance immunity.

In an embodiment, discriminator 7 comprises control means adapted to set up a given time period TIME_WINDOW starting from the generation of the first pulse PULSE_P or PULSE_N of said other means; the control means are adapted to check whether within said time period the second pulse PULSE_N or PULSE_P is generated and are adapted to trigger said decoding means of the received signal only if the check result is positive. Circuit 11 is adapted to implement the control function on the time sequence of the logic signals. Indeed, the signals PULSE_P and PULSE_N are at the input of two latches P_LATCH and N_LATCH having at the output the signals P_L, P_L_NEG and N_L, N_L_NEG. The signals PULSE_P and PULSE_N are at the input of a NOR port POR_N, the output of which is at the input of another latch TW; the output Q of the latch TW is at the input of a delay cell DEL adapted to provide the time window TIME_WINDOW as the reset signal R of the latches TW, P_LATCH and N_LATCH. If a first couple of pulses between the pulses PM, MM, MP and PP meeting the described conditions comes, the time window TIME_WINDOW, the duration of which depends on the expected duration of the pulses, is started. If within such a time window the predicted couple of pulses comes, the clock signal and the data synchronous therewith are decoded. Whether the second couple of pulses did not present within the window, the signal which generated the first couple of pulses would be interpreted as a disturbance and thereby clock and data would not be decoded. The clock and data recovery circuit 12 comprises an AND port CLOCK-PULSE having at the input the signals P_L and N_L and the output of which is at the input of the latch CKFF providing the clock signal CLOCK; therefore, said clock signal CLOCK is decoded through the logic port CLOCKPULSE and the latch CKFF only if the two couples of pulses are correctly received.

Figure 14:
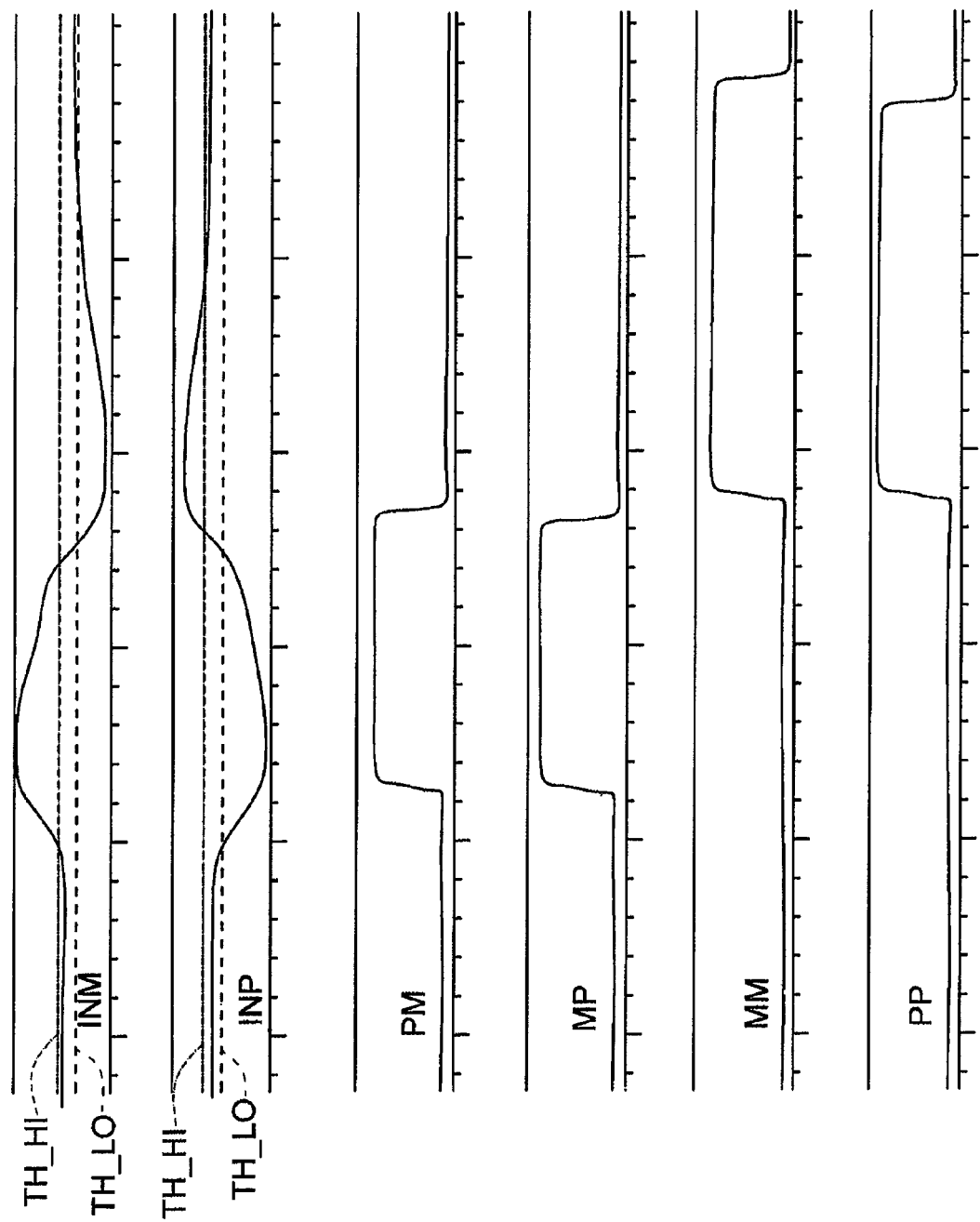
FIG. 14 shows the time diagrams of the signals involved in the comparator block of the discriminator in FIG. 11 in the absence of disturbances.
Figure 15:
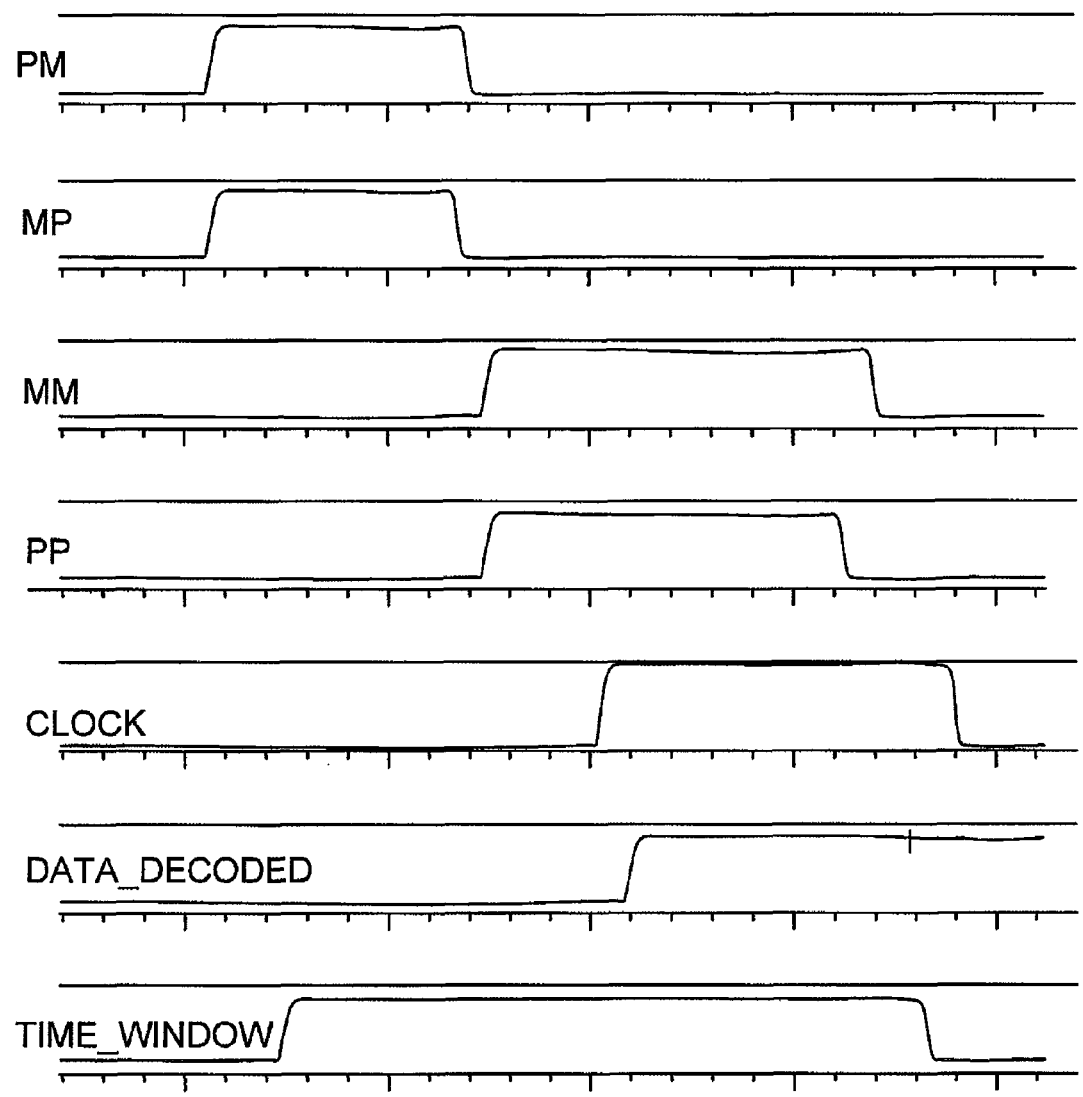
FIG. 15 shows the time diagrams of the signals involved in the discriminator in FIG. 11 in the absence of disturbances.

Therefore, the discriminator 7 may have three filtering levels of disturbances: a hysteresis between the detection thresholds of the pulses within which the differential noise or the common-mode noise is ignored, the need for the first couple of pulses to come according to the sequence in FIG. 14, the need for the second couple of pulses to come according to the sequence in FIG. 14.

Furthermore, the time window TIME_WINDOW may ensure that the system does not indefinitely keep on waiting for the second couple of pulses.

The same device 12 allows the data to be decoded. The device 12 comprises an AND port DATA$_{13}$ HIGH having at the input the signals P_L and N_L_NEG and the output of which is at the input of the latch DATASET, the output Q of which is at the input of an AND port 122. The device 12 also comprises an AND port DATA$_{13}$ LOW having at the input the signals N_L and P_L_NEG and the output of which is at the input of the latch DATARESET, the output Q denied of which is at the input of the AND port 122. A further latch DATA_OUT has the output of the port 122 at the input D carrying the data at the output by means of the signal DATA-DECODED only if the clock signal CLOCK is present at the input, i.e., only if the clock signal CLOCK is decoded.

A receiver 4 may be implemented, comprising the input stage coupled to the turn L2 and provided with the disturbance rejection circuit 6 or the circuit comprising the circuital blocks 51, 53 and 54 and the decoder 700 of the known type for decoding the received signal, in accordance with an embodiment.

A receiver 4 may also be implemented, comprising the discriminator 7 in accordance with an embodiment and an amplifier of the known type 55 arranged between the turn L2 and the input of the discriminator 7.

Figure 16:
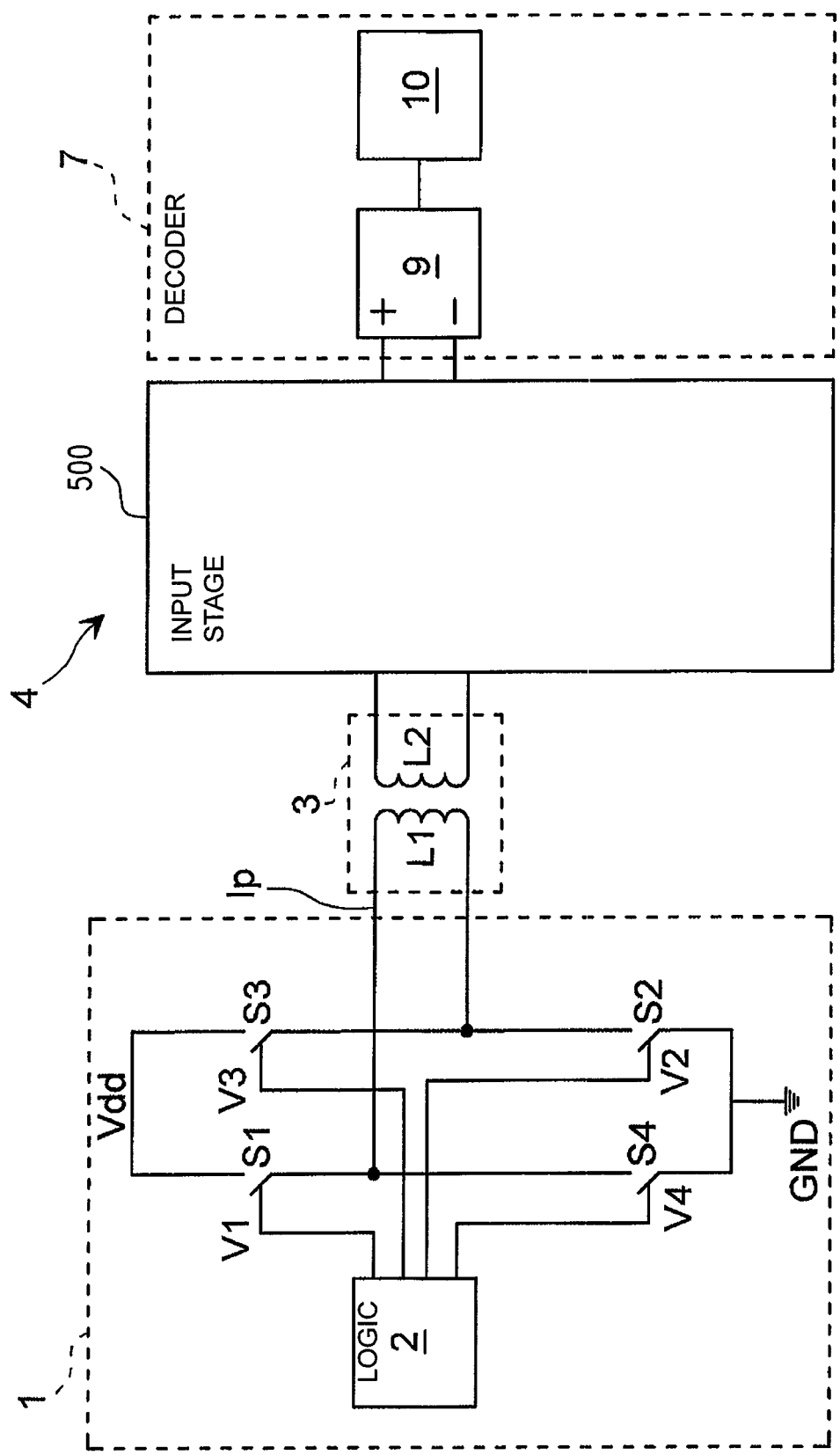
FIG. 16 shows the receiver for a communication system in accordance with a third embodiment of the disclosure.

A receiver 4 may also be implemented, in accordance with an embodiment, comprising both the input stage 500, which may comprise, for example, the input stage 5 of FIGS. 6a and 6b, or the input stage 50 of FIG. 9, coupled to the turn L2 and provided with the disturbance rejection circuit 6 or the circuit comprising the circuit blocks 51, 53 and 54, as denoted in the first embodiment and its variations, and the discriminator 7, as denoted in the second embodiment, to obtain a more-disturbance immune receiver 4, as shown in FIG. 16.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A receiver, comprising: an input stage configured to receive a coded signal transmitted over a wireless interface and to output a differential signal based on the received coded signal, wherein the received coded signal is coded by a pair of pulses comprising a first coding pulse having a polarity and a second coding pulse having a polarity opposite of the polarity of the first coding pulse and a same duration and a same absolute amplitude as the first coding pulse; and a decoder coupled to the input stage and configured to decode the differential signal, the decoder including: a triggering block capable of triggering the decoder when a value of the received coded signal is outside a logical hysteresis, the triggering block being configured to: compare a first signal component of the differential signal to a first threshold above a direct current component of the differential signal and to a second threshold below the direct current component of the differential signal; compare a second signal component of the differential signal to the first threshold and the second threshold; generate a plurality of decoding logic signals based on the comparisons; and selectively trigger decoding based on an order of the generated plurality of decoding logic signals, wherein the triggering block is configured to trigger decoding when the order of the plurality of decoding logic signals indicates at least one of: the first signal component is above the first threshold while the second signal component is below the second threshold at a first instant, and, within a period of time following the first instant, the first signal component is below the second threshold while the second signal component is above the first threshold; and the second signal component is above the first threshold while the first signal component is below the second threshold at the first instant, and, within the period of time following the first instant, the second signal component is below the second threshold while the first signal component is above the first threshold.

2. The receiver according to claim 1 wherein the triggering block is configured to trigger decoding when the order of the plurality of decoding logic signals indicates: the second signal component is above the first threshold while the first signal component is below the second threshold at another instant; and within the period of time following the another instant, the second signal component is below the second threshold while the first signal component is above the first threshold.

3. The receiver according to claim 1 wherein the decoder is configured to extract a clock signal and a data signal from the differential signal.

4. The receiver of claim 1, wherein the coded signal is coded using a plurality of current transmission pulses, each having a form of a Gaussian type.

5. A receiver, comprising: an input stage configured to receive a coded signal transmitted over a wireless interface and to output a differential signal based on the received coded signal, wherein the received coded signal is coded by a pair of pulses comprising a first coding pulse having a polarity and a second coding pulse having a polarity opposite of the polarity of the first coding pulse and a same duration and a same absolute amplitude as the first coding pulse; and a decoder coupled to the input stage and configured to decode the differential signal, the decoder including: a triggering block capable of triggering the decoder when a value of the received coded signal is outside a logical hysteresis, the triggering block being configured to: compare a first signal component of the differential signal to a first threshold above a direct current component of the differential signal and to a second threshold below the direct current component of the differential signal; compare a second signal component of the differential signal to the first threshold and the second threshold; generate a plurality of decoding logic signals based on the comparisons; and selectively trigger decoding based on an order of the generated plurality of decoding logic signals, wherein the triggering block comprises a pulse generator configured to generate logic pulses based on the order of the plurality of decoding logic signals and a window generator configured to set up a time period starting from a generation of a first logic pulse by said pulse generator due to generation of a first set of decoding logic signals, said window generator configured to check whether within said time period a second logic pulse is generated, following the first and due to the generation of a second set of decoding logic signals, and to trigger said decoding of the differential signal when a result of the check is positive.

6. The receiver according to claim 5 wherein the decoder is configured to extract a clock signal and a data signal from the differential signal and the pulse generator comprises two AND ports configured to receive the first and second sets of decoding logic signals and to output the first and second logic pulses and said window generator comprises a first latch having an input configured to receive the first logic pulse and a second latch having an input configured to receive the second logic pulse, wherein the first and second latches are configured to receive a signal corresponding to said time period as a reset signal, and to output triggering pulses to trigger the decoding when both the first and the second logic pulses are present at the respective inputs of the latches.

7. A system, comprising: an antenna configured to receive coded signals; and a decoder coupled to the antenna and configured to decode received coded differential signals, wherein the received coded signals are coded by pairs of pulses, each pair comprising a first coding pulse and a second coding pulse having a polarity opposite of a polarity of the first coding pulse and a same duration and a same absolute amplitude as the first coding pulse, the decoder including a triggering block capable of triggering the decoder when a value of the received coded signal is outside a logical hysteresis, the triggering block being configured to: compare a first signal component of a differential signal to a first threshold above a direct current component of the differential signal and to a second threshold below the direct current component of the differential signal; compare a second signal component of the differential signal to the first threshold and the second threshold; generate a plurality of decoding logic signals based on the comparisons; and selectively trigger decoding based on an order of the generated plurality of decoding logic signals, wherein the triggering block is configured to trigger decoding when the order of the plurality of decoding logic signals indicates: the first signal component is above the first threshold while the second signal component is below the second threshold at a first instant; and within a period of time following the first instant, the first signal component is below the second threshold while the second signal component is above the first threshold.

8. The system of claim 7, further comprising an input stage coupled between the antenna and the decoder and configured to output the differential signal based on a received differential signal.

9. The system of claim 7, further comprising:
a transmitter configured to code signals for transmission.

10. The system of claim 9 wherein the antenna is a first antenna of a wireless interface, the wireless interface comprising a second antenna coupled to the transmitter.

11. The system of claim 10 wherein the transmitter is configured to code a data signal to be sent and a clock signal.

12. The system of claim 7 wherein the triggering block is configured to trigger decoding when the order of the plurality of decoding logic signals indicates: the second signal component is above the first threshold while the first signal component is below the second threshold at another instant; and within the period of time following the another instant, the second signal component is below the second threshold while the first signal component is above the first threshold.

13. A system, comprising: a transmitter configured to code signals for transmission;
a wireless interface comprising a first antenna configured to receive coded signals and a second antenna coupled to the transmitter; and a decoder coupled to the first antenna and configured to decode received coded differential signals, wherein the received coded signals are coded by pairs of pulses, each pair comprising a first coding pulse and a second coding pulse having a polarity opposite of a polarity of the first coding pulse and a same duration and a same absolute amplitude as the first coding pulse, the decoder including a triggering block configured to: compare a first signal component of a differential signal to a first threshold above a direct current component of the differential signal and to a second threshold below the direct current component of the differential signal; compare a second signal component of the differential signal to the first threshold and the second threshold;
generate a plurality of decoding logic signals based on the comparisons; and selectively trigger decoding based on an order of the generated plurality of decoding logic signals, wherein said transmitter comprises four switches in a bridge configuration coupled between a supply voltage and a ground and having middle points coupled to the second antenna, said transmitter configured to generate at a positive side of a clock signal a pulse of substantially a same duration as that of a current pulse to be transmitted, said pulse being at an input with a data signal of a demultiplexer comprising four AND ports, said demultiplexer configured to generate four signals for driving the switches according to a logic level of the data signal to be transmitted.

14. A system, comprising: a transmitter configured to code signals for transmission;
a wireless interface comprising a first antenna configured to receive coded signals and a second antenna coupled to the transmitter; and a decoder coupled to the first antenna and configured to decode received coded differential signals, wherein the received coded signals are coded by pairs of pulses, each pair comprising a first coding pulse and a second coding pulse having a polarity opposite of a polarity of the first coding pulse and a same duration and a same absolute amplitude as the first coding pulse, the decoder including a triggering block capable of triggering the decoder when a value of the received coded signal is outside a logical hysteresis, the triggering block being configured to: compare a first signal component of a differential signal to a first threshold above a direct current component of the differential signal and to a second threshold below the direct current component of the differential signal; compare a second signal component of the differential signal to the first threshold and the second threshold; generate a plurality of decoding logic signals based on the comparisons; and selectively trigger decoding based on an order of the generated plurality of decoding logic signals, wherein the triggering block comprises a pulse generator configured to generate logic pulses based on the order of the plurality of decoding logic signals and a window generator configured to set up a time period starting from a generation of a first logic pulse by said pulse generator due to generation of a first set of decoding logic signals, said window generator configured to check whether within said time period a second logic pulse is generated, following the first and due to the generation of a second set of decoding logic signals, and to trigger said decoding of the differential signal when a result of the check is positive.

15. A method, comprising: comparing a first signal component of a differential signal to a first threshold above a direct current component of the differential signal and to a second threshold below the direct current component of the differential signal, wherein the differential signal is coded with a first signal pulse having a polarity, a duration and an amplitude and a second signal pulse having a polarity opposite of the first signal pulse, a same duration as the first signal pulse and a same absolute amplitude as the first signal pulse; comparing a second signal component of the differential signal to the first threshold and the second threshold;
generating a plurality of decoding logic signals based on the comparisons; and controlling decoding of the differential signal based on an order of the generated plurality of decoding logic signals, wherein the controlling decoding comprises triggering decoding when a value of a received coded signal is outside a logical hysteresis by triggering decoding when the order of the plurality of decoding logic signals indicates: the first signal component is above the first threshold while the second signal component is below the second threshold at a first instant; and within a period of time following the first instant, the first signal component is below the second threshold while the second signal component is above the first threshold.

16. The method according to claim 15 wherein the controlling decoding comprises triggering decoding when the order of the plurality of decoding logic signals indicates: the second signal component is above the first threshold while the second signal component is below the second threshold at another instant; and within the period of time following the another instant, the second signal component is below the second threshold while the first signal component is above the first threshold.

17. The method according to claim 15 wherein the controlling decoding comprises:
generating a first set of decoding logic signals based on the comparing;
generating a second set of decoding logic signals based on the comparing;
generating a first logic pulse signal based on the first set of decoding logic signals;
generating a second logic pulse signal based on the second set of decoding logic signals; and
enabling decoding based on the first and second logic pulse signals.

18. The method of claim 17 wherein the enabling decoding comprises enabling decoding based on a timing of the first and second logic pulse signals.

19. The method of claim 18 wherein enabling decoding comprises determining whether a pulse of the second logic pulse signal occurs within a time period after a pulse of the first logic pulse signal.

20. A system, comprising: means for decoding differential signals coded with a first signal pulse having a polarity, a duration and an amplitude and a second signal pulse having a polarity opposite of the first signal pulse, a same duration as the first signal pulse and a same absolute amplitude as the first signal pulse; means for comparing each of two signal components of coded differential signals to first and to second logic thresholds, the first logic threshold having a value larger than a value of a direct current component of the differential signals and the second logic threshold having a value smaller than the value of the direct current component of the differential signals; and means for controlling the means for decoding based on the comparisons, wherein the means for controlling is capable of triggering the means for decoding when a received coded signal is outside a logical hysteresis and comprises: means for generating a first plurality of decoding logic signals based on the comparisons; means for generating a second plurality of decoding logic signals based on the comparisons; means for generating a first logic pulse signal based on the first plurality of decoding logic signals; means for generating a second logic pulse signal based on the second plurality of decoding logic signals; and means for enabling decoding based on the first and second logic pulse signals.

21. The system of claim 20, further comprising:
means for receiving coded differential signals coupled to the means for decoding;
means for transmitting coded differential signals; and
means for coupling the means for transmitting to the means for receiving.

22. The system of claim 21 wherein the means for coupling the means for transmitting to the means for receiving comprises means for galvanically isolating the means for transmitting from the means for receiving.

23. The system of claim 20 wherein the means for enabling comprises means for determining whether a pulse generated by the means for generating a second logic pulse signal occurs within a time period after a pulse generated by the means for generating a first logic pulse signal.

* * * * *

UNITED STATES PATENT AND TRADEMARK OFFICE
CERTIFICATE OF CORRECTION

PATENT NO.        : 8,576,930 B2
APPLICATION NO.   : 12/846508
DATED             : November 5, 2013
INVENTOR(S)       : Lombardo et al.

Page 1 of 1

It is certified that error appears in the above-identified patent and that said Letters Patent is hereby corrected as shown below:

On the Title Page, Item [73]:
"STMicoelectronics S.r.l., Agrate Brianza (IT)" should read, --STMicroelectronics S.r.l., Agrate Brianza (IT)--.

Signed and Sealed this
Twentieth Day of May, 2014

Michelle K. Lee
*Deputy Director of the United States Patent and Trademark Office*